United States Patent
Shah et al.

(10) Patent No.: US 11,714,483 B2
(45) Date of Patent: Aug. 1, 2023

(54) SYSTEMS, METHODS, AND DEVICES FOR PROVIDING VIRTUAL-REALITY OR MIXED-REALITY EXPERIENCES WITH SPECIAL EFFECTS TO A USER IN OR UNDER WATER

(71) Applicant: Ballast Technologies, Inc., San Francisco, CA (US)

(72) Inventors: Ananda Shah, Berkeley, CA (US); Alkis Roufas, San Francisco, CA (US); Stephen Greenwood, San Francisco, CA (US); Jim Mayfield, Diamond Springs, CA (US); Kyle Mayfield, Diamond Springs, CA (US); Hannah De Bie, Diamond Springs, CA (US); Keenan Mayfield, Diamond Springs, CA (US)

(73) Assignee: Ballast Technologies, Inc., San Francisco, CA (US)

( * ) Notice: Subject to any disclaimer, the term of this patent is extended or adjusted under 35 U.S.C. 154(b) by 23 days.

(21) Appl. No.: 17/474,295

(22) Filed: Sep. 14, 2021

(65) Prior Publication Data

US 2022/0083128 A1 Mar. 17, 2022

Related U.S. Application Data

(60) Provisional application No. 63/078,885, filed on Sep. 15, 2020.

(51) Int. Cl.
*G06T 19/00* (2011.01)
*G06F 3/01* (2006.01)
(Continued)

(52) U.S. Cl.
CPC .............. *G06F 3/011* (2013.01); *B63C 11/12* (2013.01); *G02B 27/017* (2013.01);
(Continued)

(58) Field of Classification Search
None
See application file for complete search history.

(56) References Cited

U.S. PATENT DOCUMENTS

| 5,219,315 A | 6/1993 | Fuller et al. |
| 9,224,100 B1 | 12/2015 | Chatterjee et al. |

(Continued)

FOREIGN PATENT DOCUMENTS

| WO | 2017153532 A1 | 9/2017 |
| WO | 2019091675 A1 | 5/2019 |

OTHER PUBLICATIONS

International Search Report from PCT Application No. PCT/US18/00374 (filed Sep. 24, 2018), dated Feb. 4, 2019.
(Continued)

*Primary Examiner* — Nicholas R Wilson
(74) *Attorney, Agent, or Firm* — Jacobsen IP Law; Krista S. Jacobsen

(57) ABSTRACT

Disclosed herein are systems and methods for providing VR/MR experiences to users in water through a headset and at least one special-effects device. During a VR/MR experience, a controller may send commands to a special-effects device at particular times to cause the special-effects device to create effects in synchronism with the visual portion of the VR/MR experience. A headset application that provides the visual portion of the VR/MR experience may communicate with the controller before the experience begins to establish the identity of the experience and the start time. The VR/MR experience may be selected by reading a storage medium (e.g., a near-field communication (NFC) card) that identifies the experience and/or the controller. Some information on the storage medium may be included in a metadata file (Continued)

transferred to the application. The application may send information read from the storage medium to the controller via an over-the-air network.

19 Claims, 16 Drawing Sheets

(51) Int. Cl.
*B63C 11/12* (2006.01)
*G02B 27/01* (2006.01)
*H04W 4/80* (2018.01)
*B63C 11/02* (2006.01)

(52) U.S. Cl.
CPC ............. *G06T 19/006* (2013.01); *H04W 4/80* (2018.02); *B63C 2011/021* (2013.01); *B63C 2011/121* (2013.01)

(56) References Cited

U.S. PATENT DOCUMENTS

| | | | |
|---|---|---|---|
| 9,740,010 B2 | 8/2017 | Alhashim | |
| 10,069,782 B2 | 9/2018 | Jayam et al. | |
| 10,810,798 B2 | 10/2020 | Espeset et al. | |
| 10,898,798 B2 | 1/2021 | Chapman et al. | |
| 2004/0086838 A1 | 5/2004 | Dinis | |
| 2006/0252563 A1 | 11/2006 | Werner | |
| 2014/0098215 A1 | 4/2014 | Dinis et al. | |
| 2014/0316192 A1 | 10/2014 | Zambotti et al. | |
| 2015/0321606 A1 | 11/2015 | Vartanian et al. | |
| 2016/0005232 A1 | 1/2016 | Quarles | |
| 2017/0030349 A1 | 2/2017 | Bassett et al. | |
| 2017/0060148 A1 | 3/2017 | Jebran et al. | |
| 2017/0164321 A1 | 6/2017 | Qiu et al. | |
| 2017/0266529 A1 | 9/2017 | Rekimoto | |
| 2019/0004598 A1 | 1/2019 | Gordt et al. | |
| 2019/0094540 A1 | 3/2019 | Greenwood et al. | |
| 2020/0356161 A1 | 11/2020 | Wagner | |

OTHER PUBLICATIONS

J. Durbin, "We Tried an Underwater VR Headset, and it Worked," UploadVR, Feb. 8, 2017 (available at https://uploadvr.com/tried-vr-headset-underwater-worked/).

R. Metz, "Using Virtual Reality Underwater is Weird (but Fun)," MIT Technology Review, Feb. 20, 2017 (available at https://www.technologyreview.com/s/603634/using-virtual-reality-underwater-is-weird-but-fun/).

TheoryCrackers VR, "Does VR work Underwater?," Feb. 7, 2017, YouTube video available at https://www.youtube.com/watch?v=juaJHvK6ZVA&feature=youtu.be.

Written Opinion of the International Search Authority from PCT Application No. PCT/US18/00374 (filed Sep. 24, 2018), dated Feb. 4, 2019.

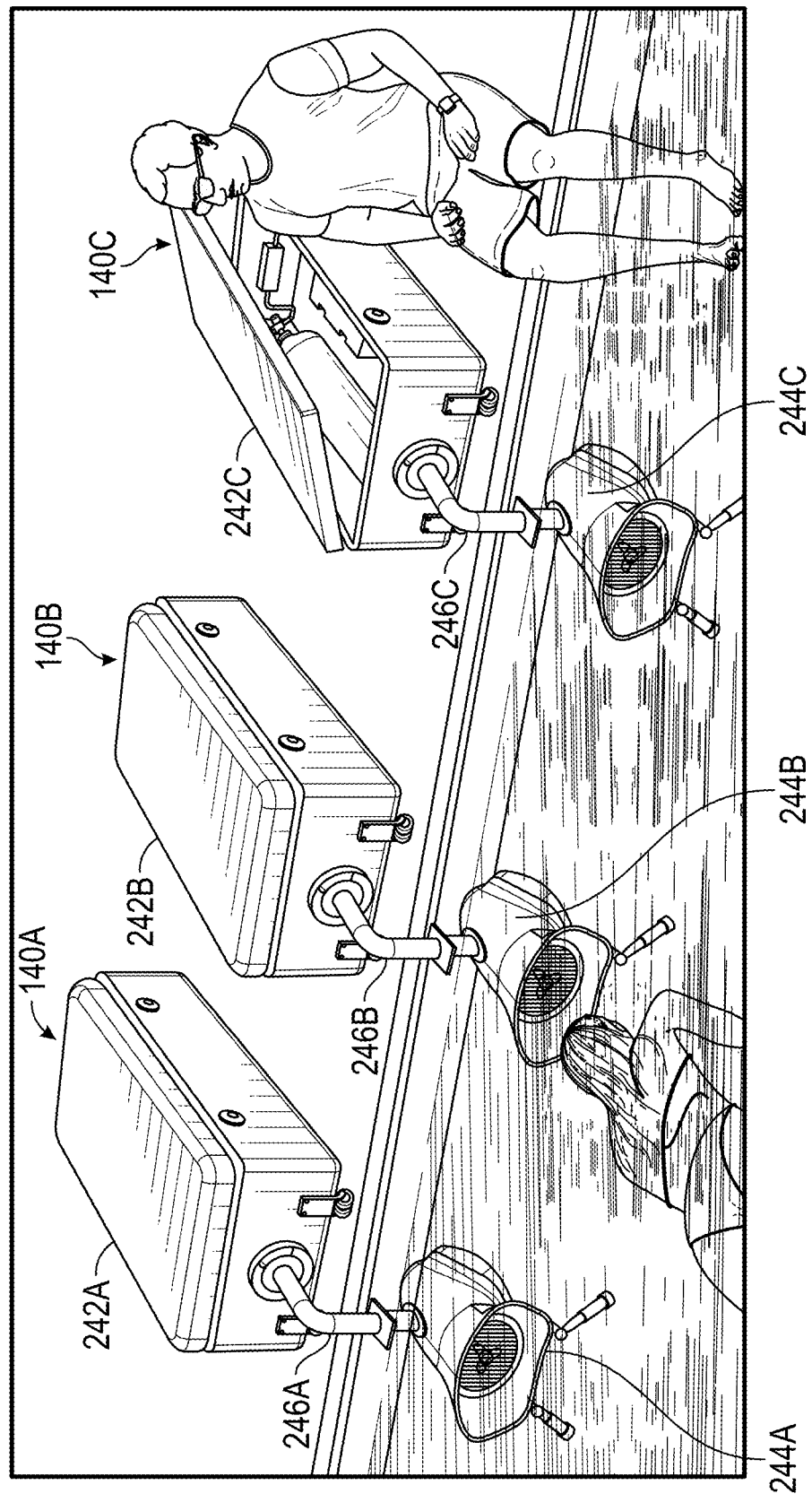

SYSTEMS, METHODS, AND DEVICES FOR PROVIDING VIRTUAL-REALITY OR MIXED-REALITY EXPERIENCES WITH SPECIAL EFFECTS TO A USER IN OR UNDER WATER

CROSS-REFERENCE TO RELATED APPLICATIONS

This application claims the benefit of U.S. Provisional Application No. 63/078,885, filed Sep. 15, 2020 and entitled "COORDINATION OF WATER-RELATED EXPERIENCES WITH VIRTUAL REALITY CONTENT," which is hereby incorporated by reference in its entirety for all purposes.

BACKGROUND

Virtual reality (VR) can refer to the creation of a fully-immersive virtual world/space experience for users. For example, computer-generated graphics may be used to create a simulated world or experience with which a user can interact. Mixed reality (MR) can refer to the blending of the real world and VR elements to generate an environment in which real world and virtual world objects interact in real-time. For example, MR may involve providing a live displayed experience of a physical, real-world environment in which the real-world elements are augmented by computer-generated sensory input. AR/MR worlds or environments may be experienced using a headset, which may be referred to as a head-mounted display (HMD).

Water-resistant or waterproof headsets allow users to be exposed to VR or MR experiences while partially or fully submerged in a body of water and thus bring a wider range of VR and/or MR content to users. Headsets that can display VR/MR content while a user is submerged under water, and systems and methods using such headsets, are disclosed in U.S. Patent Publication No. 2019/0094540, published Mar. 28, 2019 and hereby incorporated by reference in its entirety for all purposes.

There is an ongoing desire to improve systems and methods that provide VR and/or MR content to users, particularly for experiences that take place partially or entirely underwater.

SUMMARY

This summary represents non-limiting embodiments of the disclosure.

Various embodiments of the disclosure are directed to providing sensory enhancements in addition to the visual portion of water-based VR/MR experiences to users. In some embodiments, the VR/MR experiences take place partially or entirely underwater.

In some aspects, the techniques described herein relate to a method of providing a virtual-reality (VR) or mixed-reality (MR) experience to a user, the method including: application software on a mobile device obtaining information via near-field communication, the information including a controller identifier and an experience identifier identifying the VR or MR experience; the application software identifying, on the mobile device, a metadata file associated with the experience identifier; in cooperation with the mobile device, the application software sending a message via a wireless communication network addressed to a controller associated with the controller identifier, the message identifying the VR or MR experience, the controller being external to the mobile device; and in response to receiving an acknowledgement from the controller, launching the VR or MR experience.

In some aspects, the metadata file includes a plurality of triggers, each of the plurality of triggers for triggering at least one effect during the VR or MR experience.

In some aspects, at least one of the plurality of triggers is dependent on one or more of: a point of view of the user, a position of the user relative to a real-world object, a position of the user relative to another person, or a progress point in the VR or MR experience.

In some aspects, the at least one effect includes one or more of: a current, bubbles, warm air, warm water, cold air, cold water, a sound, a vibration, illumination.

In some aspects, the metadata file includes a plurality of commands, each of the plurality of commands including a timestamp and at least one effect.

In some aspects, the at least one effect includes one or more of: a current, bubbles, warm air, warm water, cold air, cold water, a sound, a vibration, illumination.

In some aspects, the message includes the metadata file.

In some aspects, the method further comprises: the controller reading a command from the metadata file; and the controller sending an instruction to a special-effects device, wherein the instruction is configured to cause the special-effects device to take an action at a predetermined time in accordance with the VR or MR experience.

In some aspects, at least a portion of the VR or MR experience takes place underwater, and the special-effects device includes a current generator, a bubble generator, a sound generator, or a vibration generator.

In some aspects, the predetermined time is dependent on one or more of: a point of view of the user, a position of the user relative to a real-world object, a position of the user relative to another person, or a progress point in the VR or MR experience.

In some aspects, the action includes creating a current, creating bubbles, blowing air, heating or cooling air, heating or cooling water, generating a sound, generating a vibration.

In some aspects, the message identifies the metadata file.

In some aspects, the method further comprises: the controller obtaining a local copy of the metadata file; the controller reading a command from the local copy of the metadata file; and the controller sending an instruction to a special-effects device, wherein the instruction is configured to cause the special-effects device to take an action at a predetermined time in accordance with the VR or MR experience.

In some aspects, at least a portion of the VR or MR experience takes place underwater, and the special-effects device includes a current generator, a bubble generator, a sound generator, or a vibration generator.

In some aspects, the predetermined time is dependent on one or more of: a point of view of the user, a position of the user relative to a real-world object, a position of the user relative to another person, or a progress point in the VR or MR experience.

In some aspects, the action includes creating a current, creating bubbles, blowing air, heating or cooling air, heating or cooling water, generating a sound, or generating a vibration.

In some aspects, the wireless communication network includes one or more of a Wi-Fi network, a Bluetooth network, a cellular network, a point-to-point wireless network, or a distributed wireless network.

In some aspects, obtaining the information via near-field communication includes the application software, in cooperation with the mobile device, reading a radio-frequency identification (RFID) or near-field communication (NFC) tag, the RFID tag or NFC tag being external to the mobile device.

In some aspects, the RFID tag is disposed in a card, which may be portable or in a fixed location.

In some aspects, the techniques described herein relate to a system for providing a selected virtual-reality (VR) or mixed-reality (MR) experience to a user in water, the selected VR or MR experience being one of a plurality of available VR or MR experiences, the system including: a first headset; and a first controller including: a first wireless communication module for communicating with the first headset over a wireless network, a first network interface for communicating with a first special-effects device, the first special-effects device for creating an effect during the selected VR or MR experience, and a first at least one processor coupled to the first wireless communication module and to the first network interface, wherein the first at least one processor is configured to execute a first set of one or more machine-executable instructions that, when executed cause the first at least one processor to: in cooperation with the first wireless communication module, receive an addressed message from the first headset over the wireless network, the addressed message identifying the first controller and the selected VR or MR experience, identify a first command for the first special-effects device; and in cooperation with the first network interface, send a first instruction to the first special-effects device, wherein the first instruction is configured to cause the first special-effects device to create the effect at a first predetermined time during the selected VR or MR experience.

In some aspects, the system further comprises: the first special-effects device, wherein the first special-effects device is configured to be coupled to the first controller through the first network interface and to create the effect at the first predetermined time during the selected VR or MR experience.

In some aspects, the effect includes one or more of: a current, bubbles, heated or cooled air, heated or cooled water, a sound, or a vibration.

In some aspects, the first special-effects device includes one or more of: a current generator, a bubble generator, a sound generator, or a vibration generator.

In some aspects, the first headset includes a watertight enclosure configured to receive a mobile device and to prevent water from entering the watertight enclosure.

In some aspects, the first headset includes a chamber configured to allow water to enter the chamber between a user's eyes and a display screen within the first headset.

In some aspects, when executed by the first at least one processor, the first set of one or more machine-executable instructions further cause the first at least one processor to: identify a second command for the first special-effects device; and in cooperation with the first network interface, send a second instruction to the first special-effects device, wherein the second instruction is configured to cause the first special-effects device to create the effect at a second predetermined time during the selected VR or MR experience.

In some aspects, the first effect or the second effect is dependent on at least one of: a point of view of the user during the selected VR or MR experience, a position of the user relative to a real-world object during the selected VR or MR experience, a position of the user relative to another person during the selected VR or MR experience, a progress point in the selected VR or MR experience, an action taken by the user during the selected VR or MR experience, an input from the user, a button press by the user, or change in breathing rate of the user during the selected VR or MR experience.

In some aspects, the first special-effects device includes at least one of: a current generator, a bubble generator, a sound generator, or a vibration generator.

In some aspects, the effect includes one or more of: a current, bubbles, heated or cooled air, heated or cooled water, a sound, or a vibration.

In some aspects, the effect is a first effect, and, when executed by the first at least one processor, the first set of one or more machine-executable instructions further cause the first at least one processor to: identify a second command for the first special-effects device; and in cooperation with the first network interface, send a second instruction to the first special-effects device, wherein the second instruction is configured to cause the first special-effects device to create a second effect at a second predetermined time during the selected VR or MR experience.

In some aspects, at least one of the first effect or the second effect is dependent on at least one of: a point of view of the user during the selected VR or MR experience, a position of the user relative to a real-world object during the selected VR or MR experience, a position of the user relative to another person during the selected VR or MR experience, a progress point in the selected VR or MR experience, an action taken by the user during the selected VR or MR experience, an input from the user, a button press by the user, or change in breathing rate of the user during the selected VR or MR experience.

In some aspects, the first special-effects device includes a current generator, a bubble generator, a sound generator, or a vibration generator.

In some aspects, the first effect or the second effect includes one or more of: a current, bubbles, heated or cooled air, heated or cooled water, a sound, or a vibration.

In some aspects, the effect is a first effect, the selected VR or MR experience is a first selected VR or MR experience, and the addressed message is a first addressed message, and the system further comprises: a second headset; and a second controller including: a second wireless communication module for communicating with the second headset over the wireless network, a second network interface for communicating with a second special-effects device, the second special-effects device for creating a second effect during a second selected VR or MR experience, and a second at least one processor coupled to the second wireless communication module and to the second network interface, wherein the second at least one processor is configured to execute a second set of one or more machine-executable instructions that, when executed cause the second at least one processor to: in cooperation with the second wireless communication module, receive a second addressed message from the second headset over the wireless network, the second addressed message identifying the second controller and the second selected VR or MR experience, identify a second command for the second special-effects device; and in cooperation with the second network interface, send a second instruction to the second special-effects device, wherein the second instruction is configured to cause the second special-effects device to cause a second effect at a second predetermined time during the second selected VR or MR experience, the second predetermined time being the same as or different from the first predetermined time.

In some aspects, the first selected VR or MR experience and the second selected VR or MR experience are different ones of the plurality of available VR or MR experiences.

In some aspects, the first selected VR or MR experience and the second selected VR or MR experience are asynchronous.

In some aspects, the effect is a first effect, the selected VR or MR experience is a first selected VR or MR experience of the plurality of available VR or MR experiences, and the addressed message is a first addressed message, and the first controller further comprises: a second network interface for communicating with a second special-effects device, the second special-effects device for creating a second effect during a second selected VR or MR experience of the plurality of available VR or MR experiences, and wherein, when executed by the first at least one processor, the first set of one or more machine-executable instructions further causes the first at least one processor to: in cooperation with the first wireless communication module, receive a second addressed message from the second headset over the wireless network, the second addressed message identifying the second selected VR or MR experience, identify a second command for the second special-effects device; and in cooperation with the second network interface, send a second instruction to the second special-effects device, wherein the second instruction is configured to cause the second special-effects device to create a second effect at a second predetermined time during the second selected VR or MR experience, the second predetermined time being the same as or different from the first predetermined time.

In some aspects, the first headset is configured to obtain information from an external storage device via near-field communication, wherein the information identifies the selected VR or MR experience and/or the controller.

BRIEF DESCRIPTION OF THE DRAWINGS

Objects, features, and advantages of the disclosure will be readily apparent from the following description of certain embodiments taken in conjunction with the accompanying drawings in which:

FIG. 16 illustrates the use of several special-effects devices to provide VR/MR experiences that take place partially or fully underwater in accordance with some embodiments.

Figure 1:
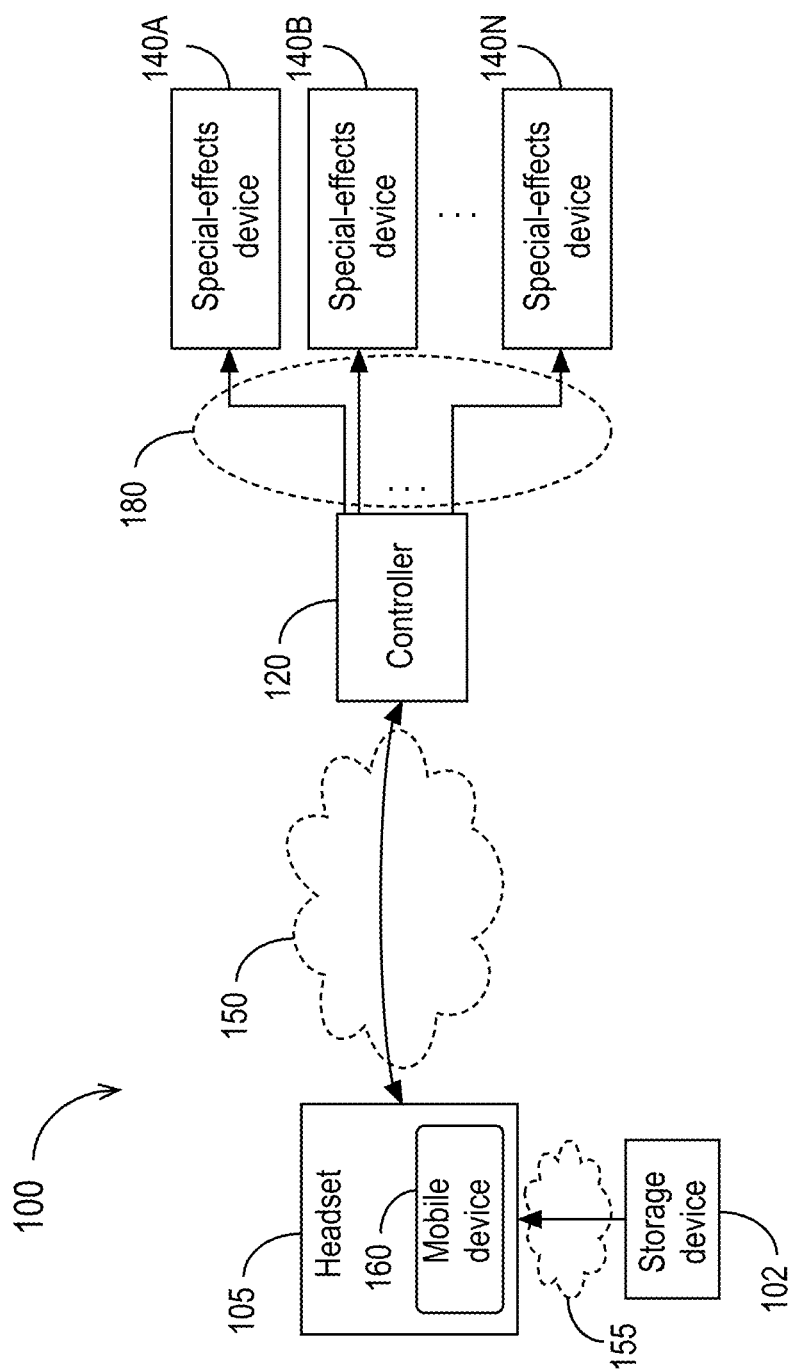
FIG. 1 is a diagram of an example system in accordance with some embodiments.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are systems and methods for providing VR and/or MR experiences ("VR/MR experiences") to users in water, where the VR/MR experience is presented through a headset (which may also be referred to as a HMD) and at least one special-effects device (e.g., a current generator, a bubble generator, a sound generator, a vibration generator, etc.). The timing of special effects (e.g., currents, bubbles, sounds, vibrations, etc.) created by the at least one special-effects device may be coordinated with the visual presentation of the VR/MR experience through the headset.

A controller may send commands or instructions to at least one special-effects device before and/or during the VR/MR experience. The controller may send the commands or instructions at particular times so that they cause the at least one special-effects device to create specified special effects in synchronism with the portion of the VR/MR experience being provided through the headset. The controller and the at least one special-effects device may be coupled together by a wired network (e.g., cabling). The controller may be one of a plurality of controllers. Each controller may be configured to control at least one special-effects device to create special effects for one VR/MR experience at a time. Alternatively, the controller may be capable of managing multiple special-effects devices to create special effects for two or more VR/MR experiences being presented at the same time (e.g., two or more VR/MR experiences are running at a particular time but do not necessarily start or finish at the same time).

An application that manages and/or presents the visual portion of the VR/MR experience (e.g., a mobile application running on a mobile device inserted in the headset, a software application of the headset, etc.) may communicate with the controller before the VR/MR experience begins. For example, the application and controller may execute a handshaking procedure that establishes, for example, the identity of the VR/MR experience that will be presented and the start time of that experience (e.g., the time at which it will begin). The application and controller may communicate before the VR/MR experience begins via an over-the-air network (e.g., Wi-Fi, Bluetooth, etc.). This communication may take place before the headset is partially or fully submerged.

The VR/MR experience that is presented may be a selected one of a plurality of available VR/MR experiences. The VR/MR experience that is presented may be selected by reading a storage medium (e.g., a near-field communication (NFC) card). For example, the headset itself or a mobile device that is in or that will be placed in the headset can read a NFC card in its proximity. The NFC card may be portable/loose, or it may be in a fixed location (e.g., tethered to another device, such as a controller, special-effects device, etc.). The storage medium can contain, for example, information identifying the selected VR/MR experience (an "experience ID"), and/or information identifying the controller that will be responsible for creating special effects in coordination with the portion of the VR/MR experience presented through the headset (a "controller ID"), and/or information describing the special effects that will be created during the VR/MR experience, and/or the timing of special effects that will be created during the VR/MR experience. Some or all of the information on the storage medium may be included in a metadata file that may be transferred to the application. The application may send some or all of the information read from the storage medium to the controller via the over-the-air network.

FIG. 1 is a diagram of an example system 100 in accordance with some embodiments. The example system 100 shown in FIG. 1 includes a headset 105, a storage device 102, a controller 120, and at least one special-effects device 140. Each of these components is described in further detail below.

Figure 2B:
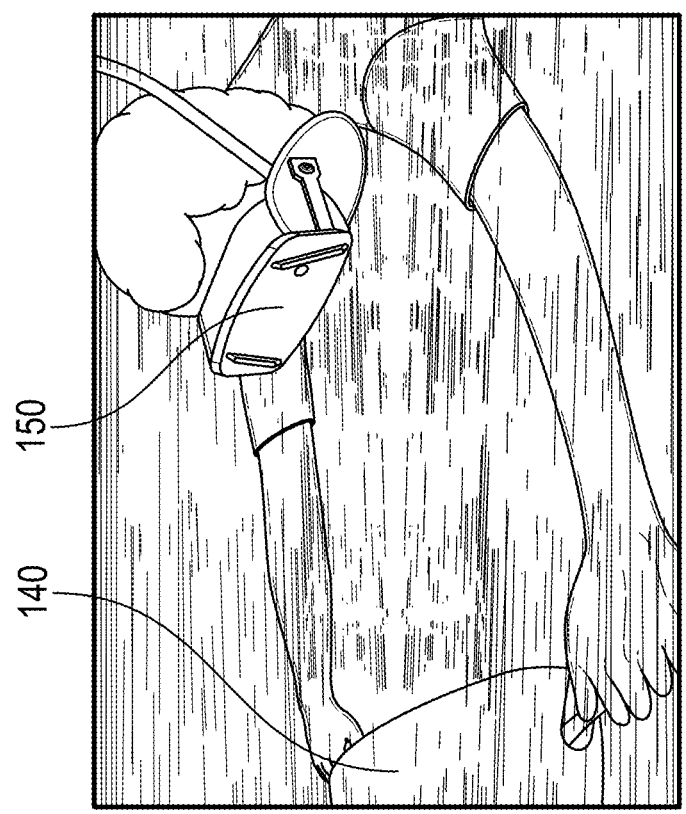
FIG. 2B shows a user in water wearing the headset and holding onto a special-effects device during a VR/MR experience in accordance with some embodiments.
Figure 2A:
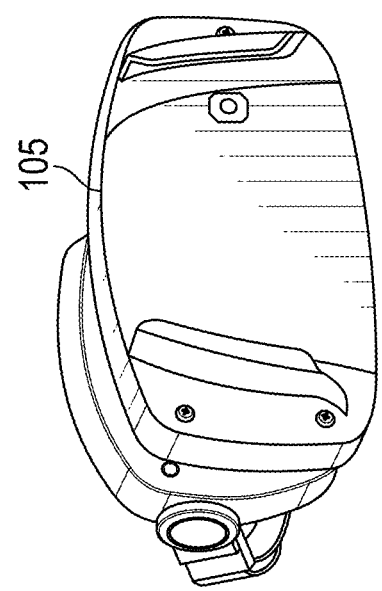
FIG. 2A shows an example headset in accordance with some embodiments.

As described further below, the headset 105 is capable of retrieving information from the storage device 102 over a network 155 (e.g., via NFC). The headset 105 and the controller 120 are capable of communicating with each other over a wireless communication network 150 (e.g., Wi-Fi, Bluetooth, Zigbee, WiMAX, cellular, etc.). The wireless communication network 150 can be any point-to-point or distributed wireless network. For VR/MR experiences that take place partially or entirely underwater, the controller 120 and headset 105 can communicate over the wireless communication network 150 before the headset 105 is submerged so that underwater wireless communication, which can be difficult, slow, and/or unreliable, is not required. The controller 120 is capable of controlling the at least one special-effects device 140 over a network 180 (e.g., a wired or wireless network). For underwater VR/MR experiences, the network 180 can be a wired network (e.g., Ethernet, RS-232, USB, coaxial, twisted-pair, etc.) to improve the speed and reliability of commands/instructions sent by the controller 120 to underwater special-effects device(s) 140. Headset FIG. 2A shows an example headset 105 in accordance with some embodiments, and FIG. 2B shows a user in water wearing the headset 105 and holding onto a special-effects device 140 during a VR/MR experience as described further below.

Figure 3:
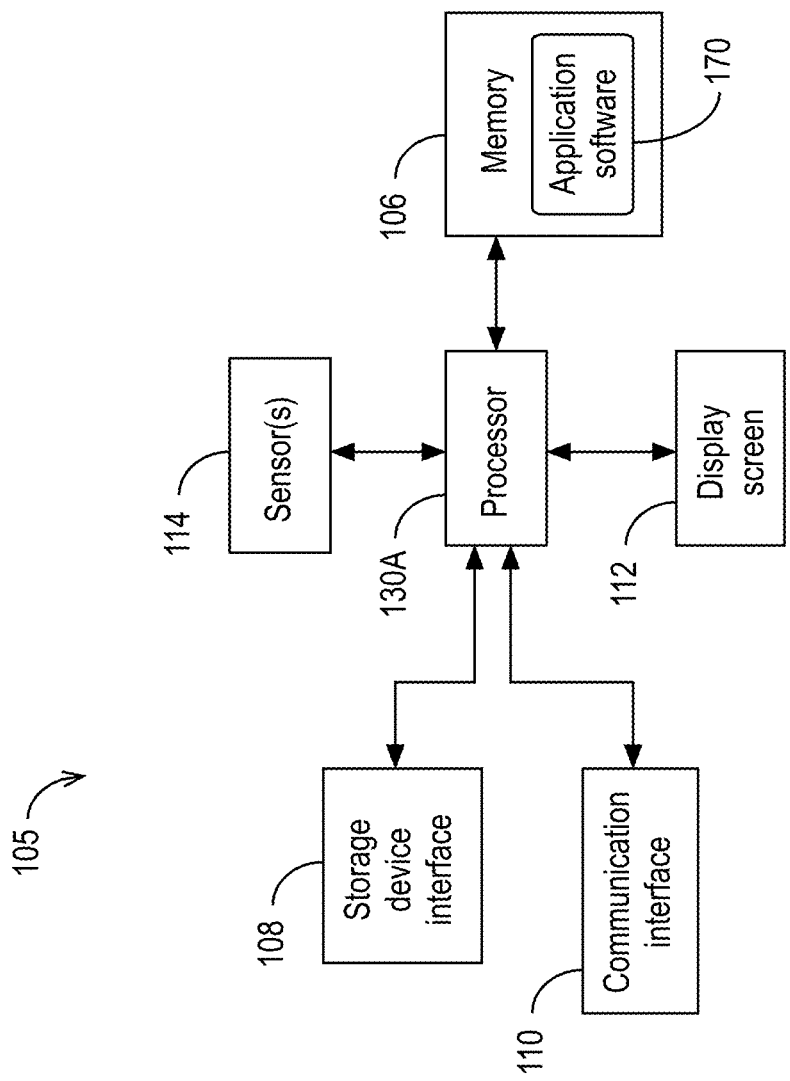
FIG. 3 illustrates some of the electronic components of a headset in accordance with some embodiments.

FIG. 3 illustrates some of the electronic components of a headset 105 in accordance with some embodiments. In the example of FIG. 3, the headset 105 includes a processor 130A, which may be, for example, a digital signal processor, microprocessor, central processing unit (CPU), or any other hardware configured to execute machine-executable instructions (e.g., including but not limited to, an application-specific integrated circuit (ASIC), a controller, a programmable circuit (e.g., FPGA), etc.). As shown in FIG. 3, the processor 130A interfaces with several components, including memory 106, which may store, for example, instructions for the processor 130A and/or application software 170, which is described further below. In addition, the processor 130A in the example of FIG. 3 interfaces with a storage device interface 108, a communication interface 110, one or more sensors 114, and a display screen 112.

The storage device interface 108 is configured to allow the processor 130A of the headset 105 to read an external storage device 102, described further below. The storage device interface 108 may be, for example, a near-field communication (NFC) reader to read a storage device 102 that is an RFID or NFC tag or an RFID or NFC card. The RFID or NFC card may be portable/movable, or it may be in a fixed location (e.g., incorporated into or tethered to another item, such as a special-effects device 140, controller 120, or even a person operating the system 100). As another example, the storage device interface 108 may be an optical sensor (e.g., a camera) to read a barcode (e.g., a QR code, etc.) or other visual indicia from the storage device 102. As another example, the storage device interface 108 may be a wireless communication interface (e.g., Bluetooth, Wi-Fi, Zigbee, etc.) configured to read data from an external device or controller (e.g., a mobile device such as a tablet) that is in communication with the headset 105 (e.g., via application software 170 or processor 130A). As yet another example, the storage device interface 108 may comprise a proximity sensor configured to detect the storage device 102 (e.g., via Bluetooth).

The reading of the storage device 102 can be triggered in any suitable way. For example, the headset 105 may comprise a button that can be pressed to cause the storage device interface 108 to read a storage device 102. As another example, in embodiments in which the headset 105 houses a mobile device 160, the mobile device 160 may include an application that, when launched, causes the mobile device 160 to read the storage device 102. As explained further below, the reading of the storage device 102 can be assisted or triggered by the one or more sensors 114.

The communication interface 110 is configured to allow the headset 105 to communicate with the external controller 120, described further below, over the wireless communication network 150. The communication interface 110 may provide for, for example, radio-frequency (RF) communication. The communication interface 110 may provide connectivity to, for example, a wireless network, such as a wireless local-area network (LAN), Wi-Fi (e.g., one or more versions of 802.11), Bluetooth, Zigbee, infrared (IR), or any other wireless network. Alternatively, or in addition, the communication interface 110 may provide for connectivity via a wired network (e.g., Ethernet, USB, etc.). The storage device interface 108 and communication interface 110 may be one and the same. For example, as explained above, the storage device interface 108 may provide connectivity to the storage device 102 via a wireless network (e.g., Bluetooth, Wi-Fi, Zigbee, etc.).

The one or more sensors 114 may be used, for example, to determine the position and/or orientation of the headset 105. For example, the one or more sensors 114 may be configured to detect motion of the headset 105, such as, for example, by sensing acceleration, rotation, etc. (e.g., using an accelerometer, gyroscope, etc.). As another example, the one or more sensors 114 may be configured to detect beacons or markers in the vicinity of the headset 105, as disclosed in U.S. Patent Publication No. 2019/0094540. For example, passive tags can be affixed to stationary objects in the vicinity of where the VR/MR experience will take place, and the one or more sensors 114 can be configured to detect the tags to allow the processor 130A to determine the position and/or orientation of the headset 105. As a simple example, the passive tags may be reflective decals affixed, e.g., to the sides of a swimming pool under the water line, and the one or more sensors 114 may comprise an optical detector to detect the reflective decals and relay this information to the processor 130A, which can then estimate the position and/or orientation of the headset 105.

As another example, active tags or beacons can be used as alternatives to passive tags or in addition to them. For example, beacons that emit signals can be positioned in the vicinity of where the VR/MR experience will take place, and those signals can be detected by the one or more sensors 114. As a specific example, if each beacon emits a signal that is distinguishable from the signals emitted by all other beacons, the processor 130A can use techniques such as triangulation to determine the position and/or orientation of the headset 105 relative to the beacons' fixed and known locations.

The one or more sensors 114 can also be used to help the headset 105 perform other functions or tasks. For example, the one or more sensors 114 can help the headset 105 to read the storage device 102 via the storage device interface 108. In some embodiments, the one or more sensors 114 are capable of detecting gestures, which may be used for various purposes. For example, the one or more sensors 114 may be capable of detecting a particular hand gesture (e.g., via a camera or internal measurement unit, which may be in a mobile device 160) that causes the headset 105 to read the storage device 102 or take some other action. As another example, the one or more sensors 114 can comprise an audio sensor capable of detecting encoded acoustic signals or prompts (e.g., to cause the headset 105 to read the storage device 102). As another example, the one or more sensors 114 may comprise a barometric sensor capable of detecting that the headset 105 has been submerged. As yet another example, the one or more sensors 114 may comprise a magnetic sensor (e.g., a magnetometer) configured to detect a magnetic signature or magnetically-encoded information (e.g., from magnets placed in three-dimensional space).

Figure 4:
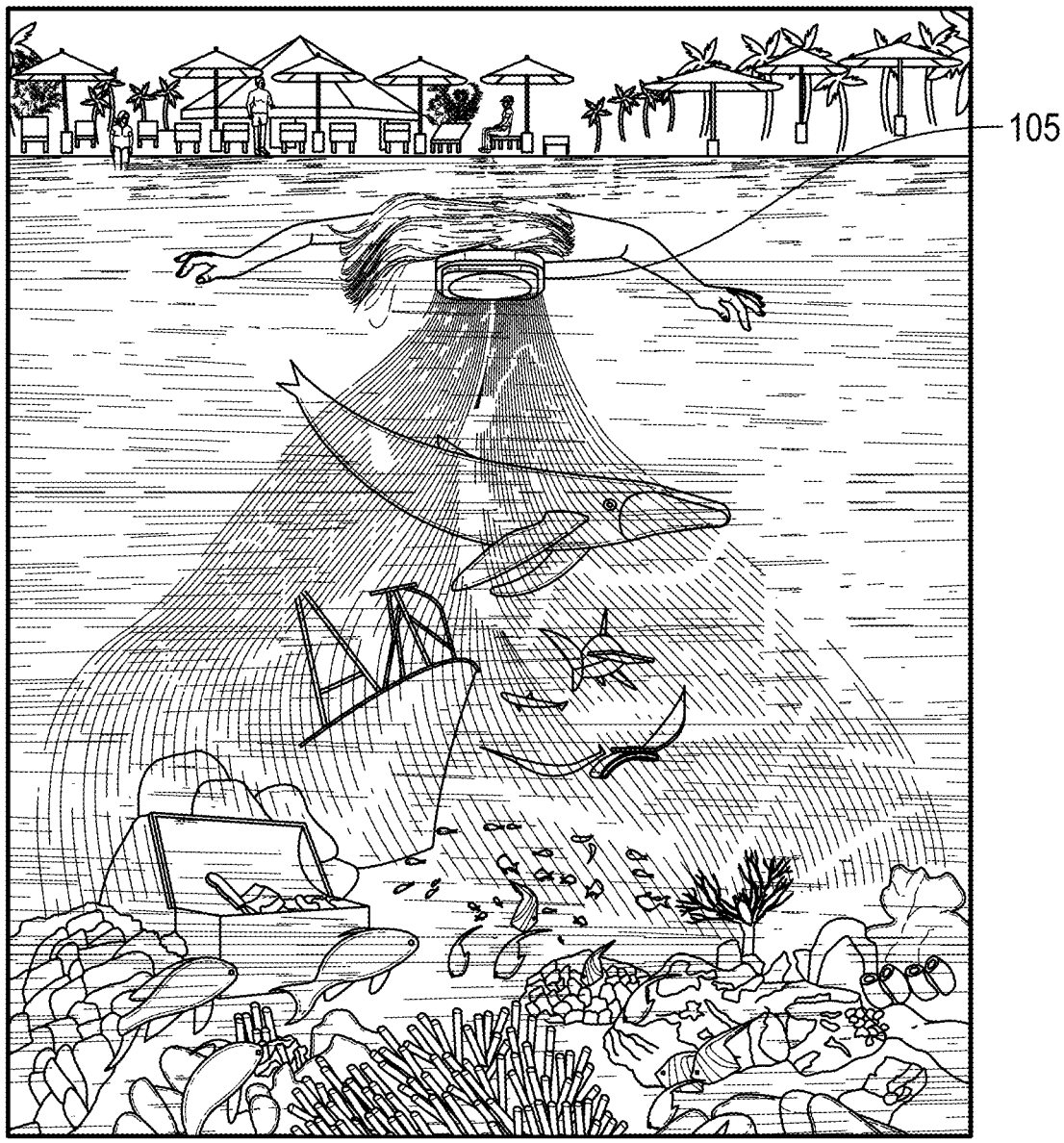
FIG. 4 is an illustration of a user in water experiencing an exemplary VR/MR experience through a headset in accordance with some embodiments.

The headset 105 also includes a display screen 112, which provides the visual portion of the VR/MR experience. The display screen 112 may be provided by a removable mobile device 160 inserted into the headset 105 or as an integrated part of the headset 105. The display screen 112 may provide an entirely virtual view (e.g., it may be opaque) to the user, or it may comprise an optical see-through or video see-through display that supplements the user's view of the real world environment with overlaid digital objects. The display screen 112 may be opaque (not see-through) or partially transparent or translucent (see-through). For example, the display screen 112 may include a transparent OLED or LED screen that uses a waveguide or light guide to display digital objects overlaid over the real-world environment. FIG. 4 is an illustration of a user in water experiencing an exemplary VR/MR experience through a headset 105 in accordance with some embodiments.

It is to be understood that the headset 105 can include components other than those illustrated in FIG. 3. For example, whether via a mobile device 160 or as an integral component, the headset 105 may include one or more positioning components configured to determine (or to assist in determining) a location and/or orientation of the headset 105. As another example, the headset 105 can include one or more speakers. As another example, the headset 105 can include one or more lenses (e.g., situated between the user's eyes and the display screen 112 when the user wears the headset 105).

The headset 105 may provide VR or MR content in cooperation with a removable device, such as, for example, a mobile device 160 (e.g., phone, tablet, etc.) that can be temporarily or permanently incorporated into the headset 105. For example, in the example system 100 shown in FIG. 1, the headset 105 includes a mobile device 160, which may be removable from the headset 105, or it may be an integral part of the headset 105. In other embodiments, the headset 105 is a self-contained unit that provides VR or MR content without assistance from or use of a mobile device 160. In other words, in some embodiments, the headset 105 includes all electronics (e.g., processor 130A, memory 106, display screen 112, communication interface 110, storage device interface 108, one or more sensors 114, etc.) to provide VR/MR experiences. It is to be understood that some or all of the components illustrated in the example of FIG. 3 (processor 130A, memory 106, storage device interface 108, communication interface 110, display screen 112, and/or one or more sensors 114) can be included in or implemented by a mobile device 160, and others can be included in or implemented by components that are integral to the headset 105.

In some embodiments, the headset 105 is waterproof or water-resistant to allow a user in a container of water to experience VR or MR content via a display screen 112 while the user is partially or fully submerged. Some water-resistant or waterproof headsets 105 (e.g., such as those disclosed in U.S. Patent Publication No. 2019/0094540) allow content (e.g., images and video) to be clearly displayed (in focus) without the need for a large pocket of air typically required to correctly display virtual reality content. In some such headsets 105, a mask that employs soft waterproof materials such as rubber or silicone can be used to seal the area around the user's face underwater and eliminate the air gap that typically separates the display screen 112 and the optical lenses in other types of headsets 105. Upon submersion, the space between the display screen 112 and lenses (referred to herein as a chamber) fills with water, eliminating the air gap that ordinarily separates the display screen 112 from the lenses. The optical properties of water can therefore be used in conjunction with the lens elements in the mask to allow the headset 105 to produce a clear image on the display screen 112. Other headsets 105, including those that have or rely on an air gap, can also be used with the disclosures herein.

In some embodiments, the headset 105 includes a watertight enclosure into which a mobile device 160 may be inserted. In some embodiments, the mobile device 160 is water-resistant or waterproof, and the headset 105 does not need to provide (but can provide) a watertight enclosure.

Storage Device

Referring again to FIG. 1, external to the headset 105 is a storage device 102. In some embodiments, the storage device 102 stores information identifying a particular VR/MR experience (e.g., an "experience ID"), and/or information identifying the controller 120 that will be responsible for creating special effects in coordination with the portion of the VR/MR experience presented through the headset 105

(e.g., a "controller ID"). In some embodiments, the storage device 102 also, or alternatively, stores information describing the special effects that will be created (e.g., by the at least one special-effects device 140 as directed by the controller 120) during the VR/MR experience, and/or the timing of special effects that will be created during the VR/MR experience.

The storage device 102 may comprise, for example, volatile memory (e.g., random access memory (RAM)), non-volatile memory (e.g., flash storage), or some combination thereof. In some embodiments, the storage device 102 comprises a passive data store (e.g., a NFC tag) that can be read, and potentially written to, by a NFC device (e.g., a NFC reader of the headset 105 or a mobile device 160).

Some or all of the information on the storage device 102 may be included in a metadata file that may be transferred to application software 170 of the headset 105 (e.g., a mobile application running on the mobile device 160) before the VR/MR experience begins. The metadata file may correspond to a particular VR/MR experience. For example, virtual reality worlds may be created and animated within three-dimensional software engines, such as game engines. In some embodiments, a script extracts information from within these worlds and generates a metadata file for that particular experience. The metadata file may have encoded within it time-based effects signals that can be used to trigger certain special effects in the real world that are synchronized with the virtual world. For example, the script can identify all of the elements (e.g., in an underwater experience, fish, plants, etc.) that are within a configurable radius of the camera (which represents the point of view the user experiences). Thus, for example, in an underwater world, the script can capture all the instances of virtual fish swimming close to the user. As another example, in a space station simulation, the script can capture the times when doors nearby open with a hissing sound. These identified events can be precisely known and encoded as a plurality of triggers in a metadata file (e.g., a JSON file). The format of this file can be as follows: Timestamp, effect 1, effect 2, etc. The triggers can be dependent on, for example, a point of view of the user, a position of the user relative to a real-world object, a position of the user relative to another person, a progress point in the VR/MR experience, a user's movement, etc.

Some or all of the information on the storage device 102 may be transferred to the headset 105 via a network 155. In some embodiments, the network 155 is formed via inductive coupling between the storage device 102 and the headset 105 (or mobile device 160). For example, in some embodiments, the storage device 102 and the headset 105 (or mobile device 160) communicate via NFC.

In some embodiments, the storage device 102 is readable by electronics that are integral to the headset 105 (e.g., processor 130A, one or more sensors 114, transceiver, etc.), potentially in cooperation with a mobile device 160. In some embodiments, the storage device 102 is readable by a mobile device 160 (e.g., situated inside or outside of the headset 105). The storage device 102 may be read in any suitable manner. For example, the storage device 102 may be a Universal serial bus (USB) storage device that can be physically coupled to and read by the headset 105 and/or the mobile device 160. As another example, the storage device 102 may be accessible to the headset 105 and/or the mobile device 160 via a network 155, which may be a wired network (e.g., Ethernet, USB, etc.) or a wireless network (e.g., Wi-Fi, Bluetooth, NFC, etc.).

In some embodiments, the storage device 102 is a NFC storage device (e.g., a NFC card) that stores information about the VR/MR experience and/or controller 120 that will be coordinating the creation of special effects that will be presented during the VR/MR experience (e.g., via at least one special-effects device 140). In such embodiments, the storage device 102 can be read by a NFC reader that is either integral to the headset 105 or provided by a mobile device 160. An advantage of using a storage device 102 that is a NFC storage device is that the headset 105 (or mobile device 160) can read the storage device 102 merely by bringing the storage device 102 and headset 105/mobile device 160 near to each other. In embodiments in which a mobile device 160 is inserted into the headset 105, the information from the storage device 102 can be communicated to the mobile device 160 without having to remove the mobile device 160 from the headset 105 (e.g., to plug in a cable). Application Software As shown in the example of FIG. 3, in some embodiments, the headset 105 includes application software 170 that, when executed by the processor 130A, presents/manages the VR/MR content that is presented to the user through the headset 105. The application software 170 may be stored and run by one or more native components of the headset 105 (e.g., a built-in processor 130A and/or memory 106), or it may be stored in memory of a mobile device 160 (inserted into the headset 105) as a mobile application executed by a processor 130A running on the mobile device 160. It is to be understood that in embodiments in which the application software 170 is a mobile application on a mobile device 160 that is removable from the headset 105, the mobile application may be launched before or after the mobile device 160 is inserted into the headset 105.

Referring again to FIG. 1, the application software 170 is capable of communicating (with assistance from one or more hardware components, such as the communication interface 110) with the controller 120 over the wireless communication network 150. In some embodiments, the application software 170 may send some or all of the information read from the storage device 102 to the controller 120 via the wireless communication network 150.

As explained above, some or all of the information on the storage device 102 may be included in a metadata file that may be transferred to the application software 170. Alternatively, the headset 105 or mobile device 160 may store a metadata file that contains this information, and the information obtained from the storage device 102 may only identify the VR/MR experience to be launched and/or the controller 120 that will coordinate the special effects for that VR/MR experience.

In some embodiments, a headset 105 is capable of communicating with a plurality of available controllers 120. When a VR/MR experience is launched on a headset 105 (or associated mobile device 160), the headset 105 (and/or mobile device 160) can directly communicate with its assigned controller 120 over the wireless communication network 150, and transmit and receive information about the VR/MR experience.

Controller

Referring again to FIG. 1, the controller 120 is communicatively coupled to the headset 105 over the wireless communication network 150, described above. As shown in the example of FIG. 1, the controller 120 is also communicatively coupled to at least one special-effects device 140 via the network 180, which may be a wired or wireless network. In some embodiments, the controller 120 is coupled to the at least one special-effects device 140 via a wired network

180, which may be advantageous (in terms of speed and reliability) for VR/MR experiences that take place partially or entirely underwater. In some embodiments, during the VR/MR experience, the controller 120 communicates with the at least one special-effects device 140 and may have limited or no communication directly with the headset 105.

In the example illustrated in FIG. 1, the controller 120 is coupled to a plurality of special-effects devices 140, namely some number N of special-effects devices 140: the special-effects device 140A, the special-effects device 140B, . . . , and the special-effects device 140N. It is to be understood that although the use of the letter "N" in FIG. 1 could suggest that the controller 120 is coupled to fourteen special-effects devices 140, the controller 120 can be coupled to any number of special-effects devices 140 (e.g., one or more). Furthermore, it is to be understood that the special-effects device 140A, special-effects device 140B, etc. illustrated in FIG. 1 are not necessarily separate physical devices. As explained further below, some hardware can implement multiple types of special effects (e.g., bubbles and currents). Therefore, the special-effects device 140A, special-effects device 140B, etc. may be implemented by shared or separate hardware elements. Moreover, some hardware may be shared to implement multiple special-effects devices 140, and other hardware may be dedicated to implement only one special-effects device 140.

The controller 120 can send commands or instructions over the network 180 to the at least one special-effects device 140 before and/or during a VR/MR experience. The controller 120 may send the commands or instructions at particular times (e.g., predetermined times) or in response to user actions, inputs, or characteristics (e.g., orientation, point of view, etc.) so that they cause the at least one special-effects device 140 to create specified special effects in synchronism with the portion of the VR/MR experience that is being provided through the headset 105. The commands or instructions sent by the controller 120 may be specified by data in a metadata file (e.g., received from the application software 170 or retrieved from local storage at the controller 120). The controller 120 and the at least one special-effects device 140 may be coupled to each other by a wired network 180 (e.g., cabling).

As discussed further below, the controller 120 may include some or all of the following components: processor(s), communication interface(s) (e.g., for communication with the at least one special-effects device 140 and/or headset 105 and/or mobile device 160, such as to identify and/or launch and/or control VR or MR content, to communicate with a cloud server to download/upload and/or obtain software updates, VR or MR content, etc.), memory/storage (e.g., to hold VR or MR content), charging hardware and/or software (e.g., to charge an onboard rechargeable battery of the headset 105 and/or mobile device 160, to charge an onboard rechargeable battery of a special-effects device 140, etc.). If present, the charging hardware and/or software may perform charging wirelessly (e.g., via contact charging) or using a connector (e.g., USB, etc.).

For VR/MR experiences that take place partially or entirely underwater, the controller 120 may be, or may be included in, a poolside component/system that comprises hardware and/or software associated with providing flotation and/or air to users, etc.

Figure 5:
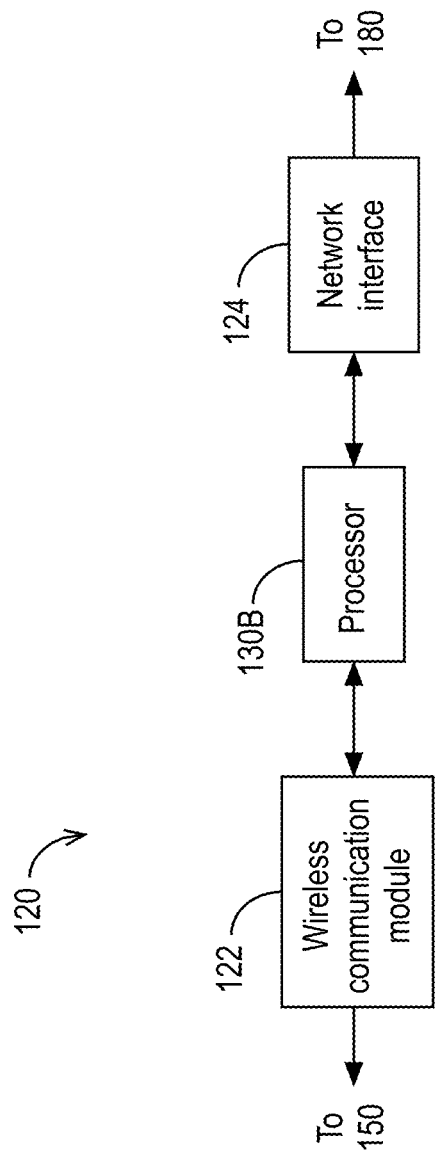
FIG. 5 is a block diagram of an example of a controller in accordance with some embodiments.

FIG. 5 is a block diagram of an example of a controller 120 in accordance with some embodiments. In the example shown in FIG. 5, the controller 120 includes a processor 130B communicatively coupled to a wireless communication module 122 and to a network interface 124. The wireless communication module 122 allows the controller 120 to communicate over the wireless communication network 150 (e.g., to communicate with the headset 105 and/or mobile device 160 and/or application software 170). The wireless communication module 122 may comprise any suitable hardware, software, and/or firmware to allow the controller 120 to communicate over the wireless communication network 150. For example, the wireless communication module 122 may comprise a Wi-Fi transceiver/module or a Bluetooth transceiver/module.

The network interface 124 allows the controller 120 to communicate over the network 180 (e.g., to control/communicate with the at least one special-effects device 140). The network interface 124 may comprise any suitable hardware, software, and/or firmware to allow the controller 120 to communicate over the network 180. For example, the network interface 124 may comprise one or more pins, wires, connectors, ports, etc. to support one or more of Ethernet, USB, TTL, clock, etc. The network interface 124 can be, for example, a USB port, an Ethernet port, etc. Generally speaking, the network interface 124 converts software to hardware signals, which may be used to interface with hardware of the special-effects device 140. For example, the hardware signals may control a motor controller 190 (discussed further below) (e.g., by instructing it to speed forward 30% for 3 seconds, then freewheel, etc.).

The processor 130B can receive transmissions over the wireless communication network 150 via the wireless communication module 122 (e.g., a request from the headset 105 and/or the mobile device 160 and/or the application software 170), and it can initiate transmissions over the wireless communication network 150 (e.g., to respond to requests from the headset 105 and/or the mobile device 160 and/or the application software 170). The processor 130B can also issue commands or instructions to the at least one special-effects device 140 over the network 180.

The commands/instructions may be based on the metadata file and/or a position and/or orientation of the headset 105 and/or an action taken by the user (e.g., a movement or a user input via a special-effects device 140) and/or an action of a VR/MR element in the VR/MR experience. The commands/instructions may indicate timing, duration, direction, temperature, intensity, and other aspects of the special effect that will be created by the at least one special-effects device 140. In embodiments in which the controller 120 is coupled to multiple special-effects devices 140 via a shared network, the commands/instructions may be addressed (e.g., they may include an address field in a header, etc.).

The controller 120 may be one of a plurality of controllers 120. Each controller 120 may be configured to control a separate set of at least one special-effects device 140 to create special effects for one VR/MR experience at a time. Alternatively, a controller 120 may be capable of managing multiple special-effects devices 140 to create special effects for two or more VR/MR experiences being presented at the same time (e.g., two or more VR/MR experiences are running at a particular time but do not necessarily start or finish at the same time).

Special Effects Device(s)

The at least one special-effects device 140 communicatively coupled to the controller 120 via the network 180 can be any suitable device(s) that can create the desired special effects for a VR/MR experience. The desired special effects may depend on the VR/MR experience. For example, the desired special effects for an underwater VR/MR experience may include bubbles, currents, heated or cooled water, heated or cooled air, vibrations, sounds, illumination (e.g., light), etc.

Figure 6:
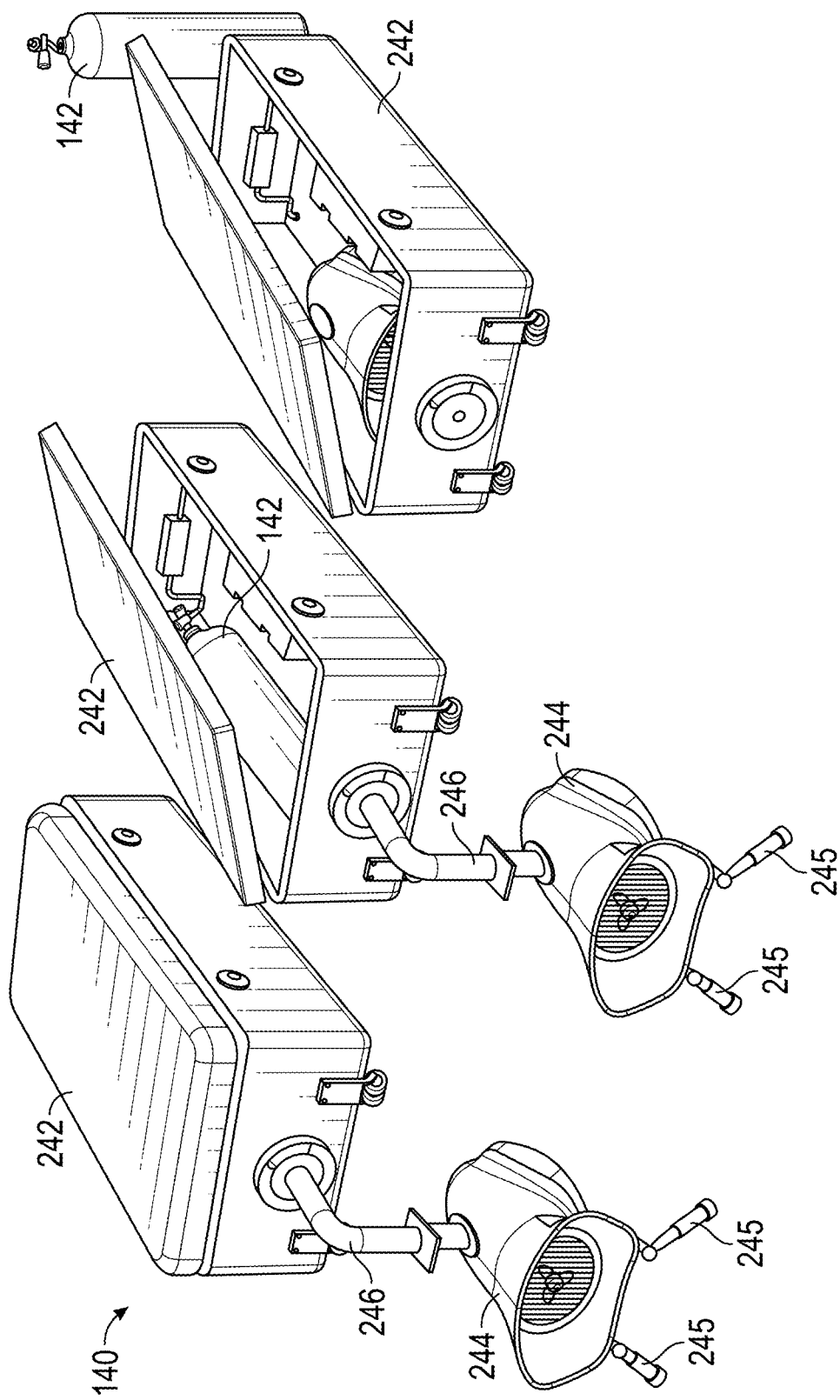
FIG. 6 illustrates an example special-effects device in accordance with some embodiments.

For underwater VR/MR experiences, the special-effects device 140 may be implemented, for example, as a poolside component. FIG. 6 illustrates an example special-effects device 140 in accordance with some embodiments. The example special-effects device 140 shown in FIG. 6 has an above-water portion 242 and a below-water portion 244. The above-water portion 242 can sit, for example, at the edge of a pool or tank that has a horizontal edge, and the below-water portion 244 can reside under the water line. The above-water portion 242 and below-water portion 244 can be connected by a connector portion 246. In some embodiments, the connector portion 246 can be detached from the above-water portion 242 and/or the below-water portion 244.

As shown in FIG. 6, the above-water portion 242 can comprise a container to house hardware used to provide the special effect(s) provided by the special-effects device 140. For example, as shown in FIG. 6, the above-water portion 242 may house an air supply 142. As described further below, an air supply 142 can be used to generate bubbles and/or currents. In some embodiments, the 242 can be used to store the connector portion 246 and/or the 244 when the special-effects device 140 is not in use, as shown in the right-most portion of FIG. 6.

In some embodiments, the below-water portion 244 comprises at least one handle 245. In the example shown in FIG. 6, the below-water portion 244 comprises two handles 245. As described further below, the least one handle 245 may comprise sensors to detect the presence of the user's hands, and/or it might be incorporated into the VR/MR experience (e.g., as part of the presentation of special effects).

Figure 7:
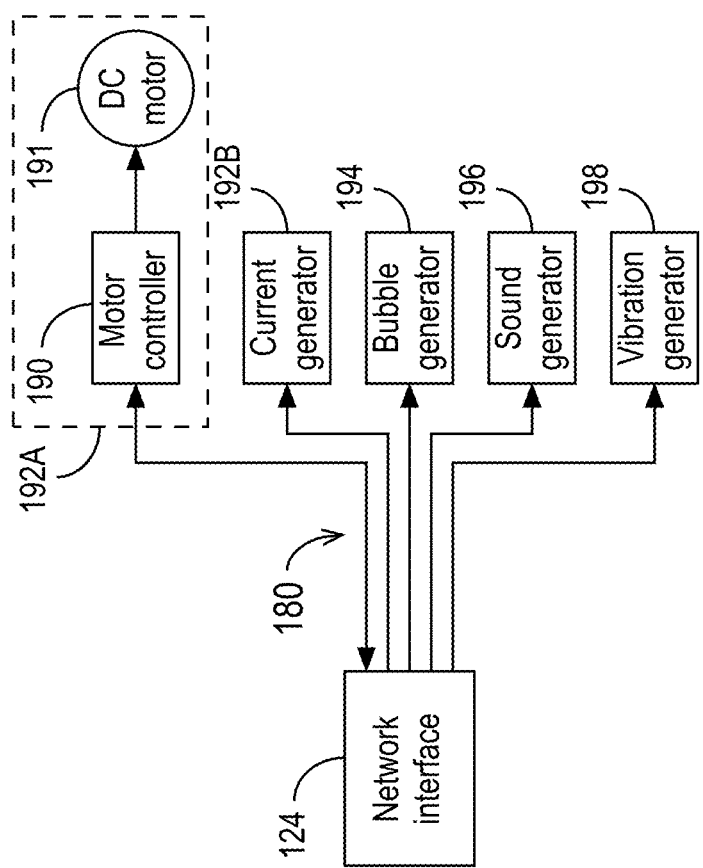
FIG. 7 is a block diagram illustrating an example of how the network interface of the controller can be connected via the network to various external hardware in accordance with some embodiments.

FIG. 7 is a block diagram illustrating an example of how the network interface 124 of the controller 120 can be connected via the network 180 to various external hardware (e.g., special-effects devices 140). As shown in the example of FIG. 7, the network interface 124 connects the controller 120 to a variety of special-effects devices 140 that can be used to enhance underwater VR/MR experiences. In the example of FIG. 7, the controller 120 is coupled to a first current generator 192A, a second current generator 192B, a bubble generator 194, a sound generator 196, and a vibration generator 198.

The example current generator 192B in FIG. 7 comprises a motor controller 190 coupled to a DC motor 191. In some embodiments, the motor controller 190 causes the DC motor 191 to turn on and/or turn off. In some embodiments, the motor controller 190 controls the speed of the DC motor 191 so as to create a current of a desired strength. In some embodiments, the motor controller 190 communicates with the controller 120 (e.g., the processor 130B) via the network 180 to provide information such as, for example, error codes, status, acknowledgements, etc. It is to be appreciated that the motor controller 190 and DC motor 191 shown in FIG. 7 are merely examples of hardware that can be included in a current generator 192A, 192B.

The current generator 192A and/or the current generator 192B (each of which is generally referred to as a current generator 192) may be used to enhance a VR/MR experience by moving water in the vicinity of the user. For example, a current generator 192 may be coupled to a water container (e.g., pool, tank, etc.), or it may be mobile (untethered from the container, movable, unattached). The current generator 192 may, for example, move the water in its vicinity (e.g., using water or air) in coordination with the VR/MR experience being provided to the user via the headset 105. The current generator 192 may be able to generate current in specified directions to provide a more realistic VR/MR experience to users. For example, if the VR/MR experience includes the user being passed on the right by a large whale that moves its tail as it passes the user, the current generator 192 can generate a current directed to the right of the user to correspond to the moving whale tail and thereby enhance the experience for the user. Thus, a current generator 192 may include one or more directional elements (e.g., flutes, pipes, movable nozzles, etc.) that allow the direction of the current to be changed. These one or more directional elements, if present, may be controlled, for example, by a motor controller 190 and/or DC motor 191. As another example, the current generator 192 may be able to heat or cool the water in its vicinity (e.g., between the current generator 192 and the user) in coordination with the VR/MR experience being provided to the user (e.g., in part via the headset 105). Thus, a current generator 192 may include one or more heating and/or cooling elements (e.g., a heater, a heating coil, a cooler, refrigerant, an ice compartment, etc.) that allows the temperature of the current to be changed. These one or more temperature elements, if present, may be controlled, for example, by a motor controller 190 and/or DC motor 191.

The current generator 192 may be held by or attached to or coupled to the user who is partaking in the VR/MR experience (e.g., the current generator 192 may be gripped by one of both of the user's hands). Whether in a fixed position or mobile, the current generator 192 can provide enhancements to the user's VR/MR experience by moving water in the user's vicinity.

The bubble generator 194 may be used to generate bubbles that are coordinated with the VR or MR content provided through the headset 105. For example, the bubble generator 194 may be coupled to the water container (e.g., pool, tank, etc.), or it may be mobile (untethered from the container, movable, unattached). The bubble generator 194 may, for example, create bubbles in its vicinity in coordination with the VR/MR experience being provided to the user via the headset 105. The bubble generator 194 may be able to generate bubbles in specified directions to provide a more realistic VR/MR experience to users. For example, if the VR/MR experience includes the user interacting with a sea creature that blows bubbles, the bubble generator 194 can be used to create such bubbles in coordination with the portion of the VR/MR experience presented by the headset 105.

The bubble generator 194 may be held by or attached to or coupled to the user who is partaking in the VR/MR experience (e.g., the bubble generator 194 may be gripped by one of both of the user's hands). Whether in a fixed position or mobile, the bubble generator 194 can provide enhancements to the user's VR/MR experience. As explained further below, the bubble generator 194 can also be used with or as a vibration generator 198.

Figure 8:
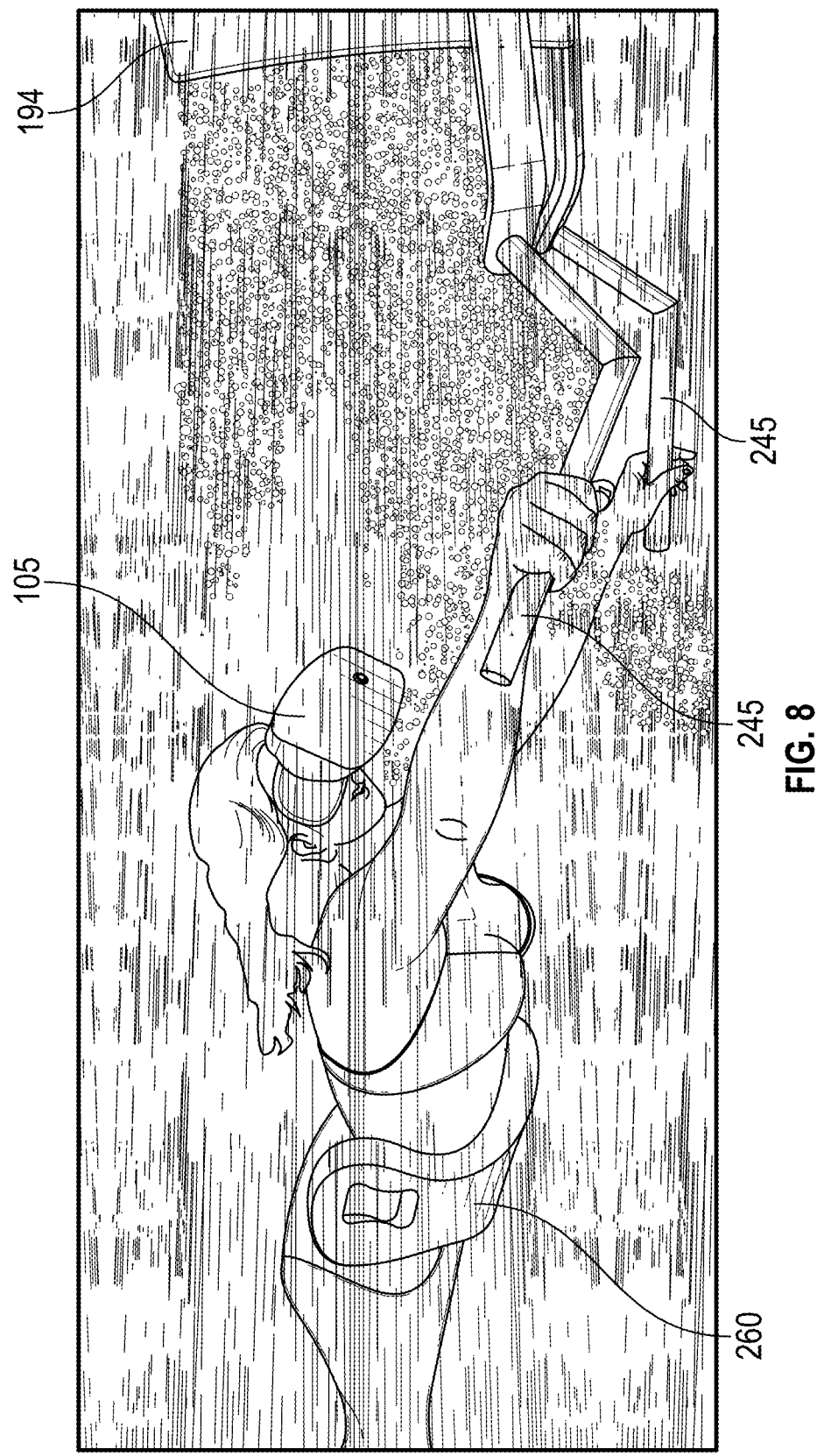
FIG. 8 shows an example bubble generator in accordance with some embodiments.

FIG. 8 shows a bubble generator 194 comprising at least one handle 245 (namely, two handles 245). A user wearing a headset 105 is gripping the at least one handle 245 while the bubble generator 194 generates bubbles during the VR/MR experience. The user is also being assisted by a flotation device 260, described further below.

The sound generator 196 may be used to create sounds in coordination with the VR/MR experience. For example, for underwater VR/MR experiences, the sound generator 196 may have underwater speakers that may be tuned to different frequency bands, which are operated in coordination with the VR/MR experience. For example, a channel at frequency f1 can provide a soundtrack for a space exploration experience, while a channel at frequency f2 can provide a soundtrack for a sea dive experience. The provided soundtracks can be coordinated with the presentation of VR or MR content via the headset 105 and/or other special-effects devices 140, or they can be "ambient" soundtracks that are appropriate regardless of the user's progress through the VR/MR experience.

The vibration generator 198 may be used to cause vibrations that can be felt by the user or provide other types of haptic feedback. For example, a vibration generator 198 may comprise handles and a bubble generator 194. In some such embodiments, the bubbles may be used to cavitate or vibrate the handles and provide haptic effects or feedback to the user. Alternatively, or in addition, the vibration generator 198 may comprise, for example, a vibration motor, a linear resonant actuator, or any other hardware that is capable of producing vibrations.

It is to be understood that FIG. 7 is a logical depiction of various special-effects devices 140, and that some or all of the illustrated, exemplary special-effects devices 140 can be combined into a single device. In other words, a single special-effects device 140 may be able to generate, for example, two or more of currents, bubbles, sounds, and/or vibrations. Moreover, multiple of a single type of special-effects device 140 can be coupled to and controlled by a single controller 120. For example, a single controller 120 may be coupled to multiple current generators 192, multiple bubble generators 194, multiple sound generator 196, and/or multiple vibration generator 198, which, during the VR/MR experience, may be placed, for example, to the left and right of the user, in front of and/or behind the user, above and/or below the user, etc. In general, a controller 120 may be coupled to and may control a wide variety of special-effects devices 140, including multiple instances of a particular type of special-effects device 140.

The special-effects device(s) 140 may be in fixed positions (e.g., attached to the side of a water container for water-based experiences) or mobile (e.g., able to be moved by the user during the VR/MR experience). One or more special-effects device(s) 140 may be coupled to the user during some or all of the VR/MR experience (e.g., held or touched by the user, or attached to the user). A system 100 may include other special-effects device(s) 140 not in contact with the user during the VR/MR experience. For example, the at least one special-effects device 140 may include a first special-effects device 140 that has handles that the user grips during the VR/MR experience, and a second special-effects device 140 that comprises a bubble or current generator that generates bubbles or currents in front of, above, below, or to the sides of the user and is not in contact with the user during the VR/MR experience.

When the VR/MR experience takes place partly or entirely underwater, and a special-effects device 140 is mobile (e.g., not attached to a water container in a fixed location), the special-effects device 140 may have some level of buoyancy so that it remains in a desired position relative to the top of the water in the water container (e.g., pool, tank, etc.). The buoyancy level may be adaptive so that buoyancy of the special-effects device 140 can be adjusted. Adaptive buoyancy may be used to enhance the user's VR/MR experience. For example, if the VR/MR experience includes diving, the buoyancy of the special-effects device 140 may be programmable/adaptive so that the special-effects device 140 dives in coordination with the VR or MR content provided via the headset 105, thus causing a user holding or attached to the special-effects device 140 to dive as well.

As an example of how the at least one special-effects device 140 can be used to enhance the user's VR/MR experience, a special-effects device 140 may include handles held by the user during the VR/MR experience. If the headset 105 (alone or in conjunction with a mobile device 160) is presenting (e.g., via the display screen 112, application software 170, etc.) VR or MR content in which the user is entering an underwater cave while holding onto a malfunctioning underwater vehicle, the special-effects device 140 can vibrate (e.g., as described below) to simulate the vibrations of the malfunctioning underwater vehicle. In addition, or instead, the same special-effects device 140 or another special-effects device 140 can direct cooled or cold (or warm or warmed) water or air toward the user as the headset 105 presents visual VR or MR content showing the user entering the cave. It is to be appreciated that there are many ways at least one special-effects device 140 can enhance the user's VR/MR experience, and the examples given herein are not intended to be limiting.

In some embodiments, the at least one special-effects device 140 is configured to sense the presence of the user and, in coordination with the headset 105 (and/or mobile device 160 and/or application software 170), provide a representation of some portion of the user in the VR/MR experience. FIG. 6 is an illustration of an example special-effects device 140 that includes at least one handle 245.

For example, in some embodiments, the at least one special-effects device 140 includes one or more handles that include pressure sensors. In some such embodiments, the pressure sensors can sense that one or both of the user's hands are on the one or more handles and transmit a signal (e.g., directly to the headset 105, mobile device 160, and/or application software 170 or to an intermediary system (e.g., the controller 120) in communication with the headset 105, mobile device 160, and/or application software 170, etc.) containing information about the sensed user's hand(s) (e.g., that the user's hands were sensed on the handles, the positions and/or orientations of the user's hands, etc.). The headset 105 (e.g., via the display screen 112) can then represent some portion of the user (e.g., one or both hands) in the visual portion of the VR/MR experience. It is to be appreciated that the presence of the user's hands does not have to be sensed in order for the user's hands to be incorporated into the VR/MR experience. For example, a special-effects device 140 has handles but not pressure sensors, and it is known that the user will hold onto the handles for the duration of the VR/MR experience, the user's hands can be assumed to be in a static position at some location on the handles and hence represented in the visual portion of the VR/MR experience. The parts of the user that are represented in the VR/MR experience, such as their own hands, can be represented to match the experience, such as being part of a space suit in a space-based VR/MR experience, or holding onto an underwater scooter in an underwater VR/MR experience, etc.

In addition to incorporating parts of the user in the VR/MR experience, the headset 105 (e.g., via the application software 170 and display screen 112) can represent a special-effects device 140 itself in the VR/MR experience. Specifically, a special-effects device 140 can be represented as something other than a special-effects device 140. For example, in the example of a special-effects device 140 that includes handles (whether with or without pressure sensors), the special-effects device 140 can be represented in the visual portion of the VR/MR experience as a jet ski, an underwater vehicle (e.g., scooter), a paraglider, a flying vehicle, an outer space vehicle, or the like.

Some or all of the at least one special-effects device 140 may be equipped with buttons, switches, touchpads, or other input devices (e.g., handles or some other part accessible to the user) that allow the user to directly interact with the VR/MR experience, thereby modifying or enhancing the experience. In some embodiments in which a special-effects device 140 includes handles that the user grips during the experience, the user can provide inputs via the handles (e.g., by pressing one or more buttons on the handles). These inputs may be detected and acted upon by a processor (e.g., an onboard processor of the special-effects device 140 or the processor 130B of the controller 120). For example, the user can provide an input that the processor interprets as an instruction to fire a grappling gun. In response, the processor can, in cooperation with the headset 105 (e.g., the application software 170 and display screen 112) and/or controller 120, generate the visuals and/or sounds and/or haptics (e.g., feel) of shooting the grappling gun underwater that would be part of the VR/MR experience.

A special-effects device 140 may be equipped with one or more sensors that allow it to determine its position and/or orientation. For example, for water-based VR/MR experiences that take place partially or entirely underwater, the special-effects device 140 may have sensors to allow it to determine its position and/or orientation within the water container. In some embodiments for providing underwater VR/MR experiences, the special-effects device 140 can use the one or more sensors to provide information, directly to the headset 105 and/or mobile device 160 and/or controller 120, about its location within the container of water. This information can then be used by the headset 105 (or a mobile device 160 and/or application software 170 within the headset 105) or the controller 120 to adjust or select the VR or MR content presented to the user via the headset 105 and/or mobile device 160. For example, if a special-effects device 140 is mobile and held by the user's hands, and the user banks the special-effects device 140 to the left, the sensors can detect that bank, and a processor onboard the special-effects device 140 can cause a signal to be transmitted to report the bank either directly to the headset 105/mobile device 160 or to the controller 120 so that the VR or MR content presented to the user via the headset 105/mobile device 160 represents the bank to the left.

In some embodiments, a special-effects device 140 includes handles the user grasps during the VR/MR experience, and the special-effects device 140 is able to generate bubbles (e.g., it comprises a bubble generator 194). In some such embodiments, the bubbles may themselves be used to cavitate or vibrate the handles and provide haptic effects or feedback to the user. The special-effects device 140 may include dedicated nozzles to release bubbles, positioned to provide different sensations on different parts of the user's body in coordination with the VR/MR experience. For example, if present, the nozzles can be placed on the left and right side of the user to generate bubbles to represent fish swimming by, or the user flying past objects on those sides respectively.

Figure 9:
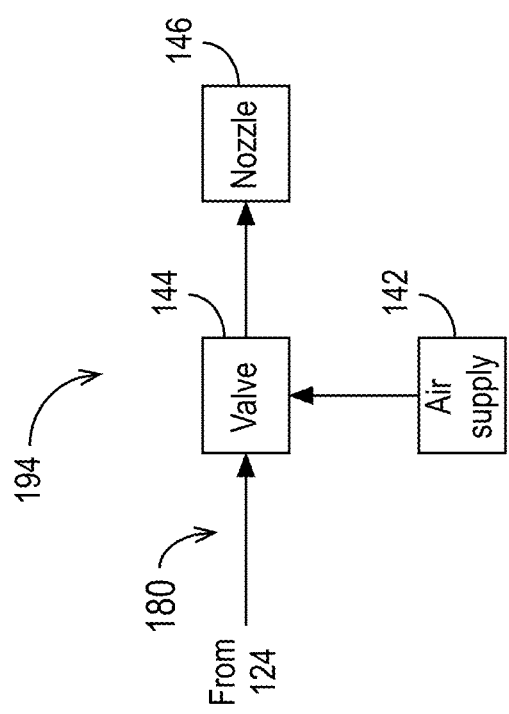
FIG. 9 is a block diagram illustrating an example of a bubble generator in accordance with some embodiments.

FIG. 9 is a block diagram illustrating an example of a bubble generator 194 in accordance with some embodiments. The bubble generator 194 comprises a valve 144 that receives air from an air supply 142. The valve 144 is connected to a nozzle 146. The controller 120 sends commands/instructions over the network 180 to open, close, or adjust (e.g., direction, amount open, etc.) the valve 144.

It is to be understood that a bubble generator 194 may comprise a plurality of valves 144, a plurality of nozzles 146, and/or a plurality of air supplies 142.

Figure 10:
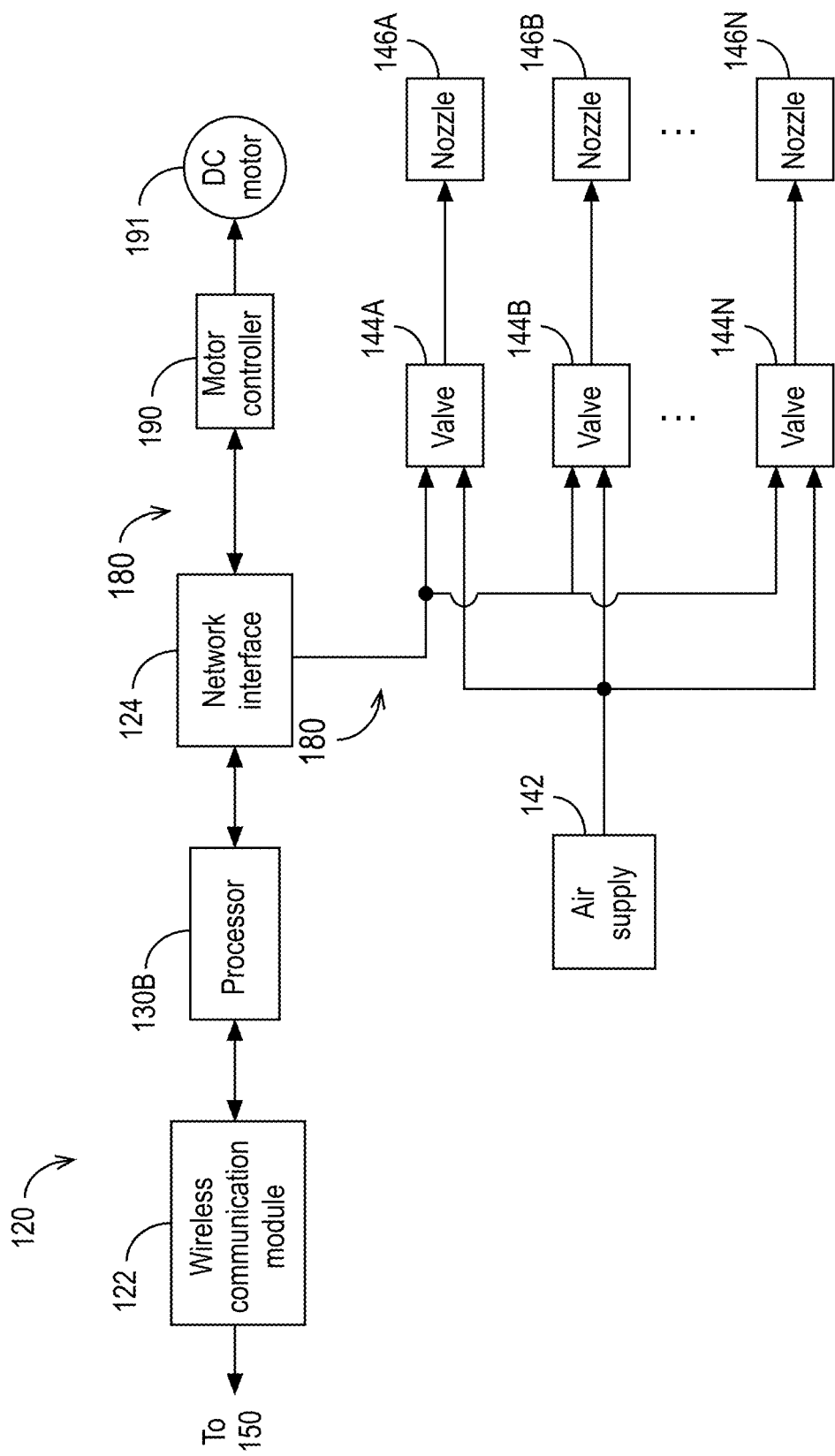
FIG. 10 is a diagram illustrating an example of a controller coupled to a plurality of special-effects devices in accordance with some embodiments.

FIG. 10 is a diagram illustrating an example of a controller 120 coupled to a plurality of special-effects devices 140 in accordance with some embodiments. The wireless communication module 122, processor 130B, and network interface 124 of the controller 120 were described above in the discussion of FIG. 5. Those descriptions apply here and are not repeated. Similarly the motor controller 190 and DC motor 191 were described above in the discussion of FIG. 7. Those descriptions apply here and are not repeated. As shown in FIG. 10, the network interface 124 is coupled to a plurality of valves 144 (e.g., the valve 144A, the valve 144B, . . . , and the valve 144N), each of which is coupled to one of a plurality of nozzles 146 (e.g., the nozzle 146A, the nozzle 146B, . . . , and the nozzle 146N). The valves 144 and nozzles 146 were described above in the discussion of FIG. 9. Those descriptions apply here and are not repeated. Also coupled to each of the valves 144 is the air supply 142. In the example of FIG. 10, a single air supply 142 provides compressed air to all of the valves 144, but it is to be understood that, as explained above, there may be more than one air supply 142.

The example controller 120 and special-effects devices 140 illustrated in FIG. 10 can be used, for example, to enhance a user's underwater VR/MR experience by creating currents, bubbles, etc.

Storage Device, Headset, Controller, and Special-Effects Device Communication

To support sensory enhancements to the user's VR/MR experience, the controller 120 and/or the special-effects device(s) 140 can be in direct communication with the headset 105 worn by the user (and/or a mobile device 160 in the headset 105 and/or the application software 170) and/or with an intermediary system (e.g., a pool-side system) that is in communication with the headset 105 and/or mobile device 160 and/or application software 170. The communication can take place before or during the VR/MR experience. Communication between the headset 105 and the controller 120 over the wireless communication network 150 can be achieved using known protocols (e.g., Bluetooth, Wi-Fi, acoustic, etc.). Similarly, communication between the controller 120 and the at least one special-effects device 140 can be achieved using known protocols (e.g., Bluetooth, Wi-Fi, acoustic, Ethernet, RS232, USB, etc.).

For VR/MR experiences that take place partially or entirely underwater, because radio signals (such as Bluetooth or Wi-Fi) may have reduced range or reliability underwater, a one-time information transfer may occur above the surface between the headset 105 and the controller 120 and/or special-effects device(s) 140, followed by immersion of the headset 105 (and, optionally, the controller 120 and/or at least one special-effects device 140). Further information transfer underwater between the headset 105 and the controller 120, or between the headset 105 and the special-effects device(s) 140, may take place via other high-reliability, but lower bandwidth protocols, such as acoustics or laser-based transmission.

In some embodiments in which VR/MR experiences take place partially or entirely underwater, the headset 105 and the controller 120 communicate reliably and efficiently over the wireless communication network 150 before the VR/MR experience begins to prepare for a VR/MR experience before the headset 105 is submerged.

Figure 11:
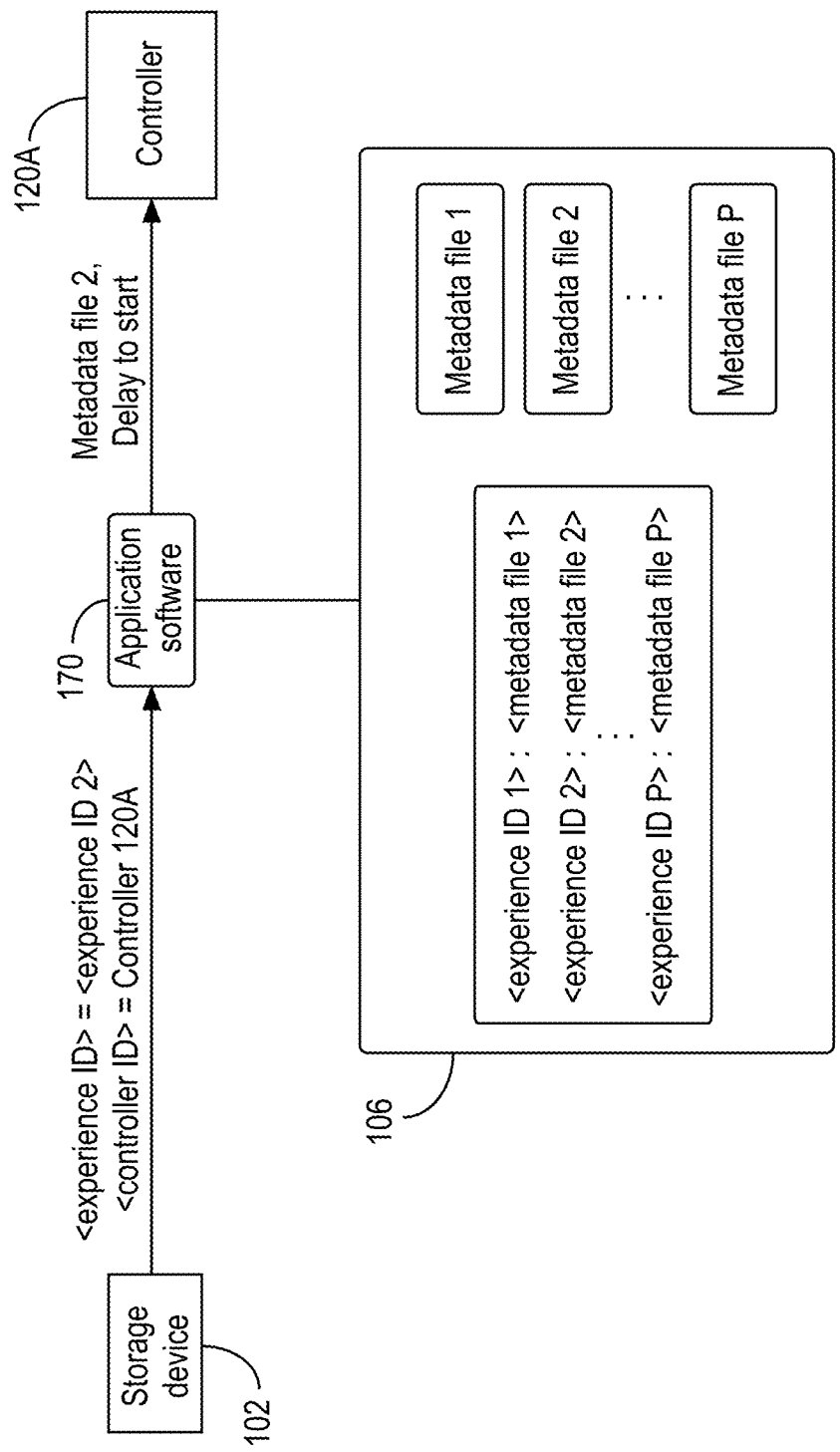
FIG. 11 is an example of how the application software communicates with the storage device and the controller in accordance with some embodiments.

FIG. 11 is an example of how the application software 170 (e.g., native to the headset 105 or running on a mobile device 160) communicates with the storage device 102 and the controller 120 in accordance with some embodiments. As shown in FIG. 11, the application software 170 can obtain from the storage device 102 an experience ID and a controller ID. In the example of FIG. 11, the experience ID is <experience ID 2>, and the controller ID identifies a particular controller 120, namely, controller 120A.

The application software 170 uses the information obtained from the storage device 102 to identify a metadata file, which may be stored in memory 106. (Refer to FIG. 3 and the discussion thereof.) In some embodiments, the application software 170 is capable of launching multiple VR/MR experiences, each of which has an associated metadata file, and the application software 170 selects the appropriate metadata file from memory 106. For example, the application software 170 can use a lookup table to identify the appropriate metadata file based on the experience ID. In the example of FIG. 11, the metadata file associated with <experience ID 2> is Metadata file 2. (Although the use of the index "P" in FIG. 11 suggests there are 16 metadata files, it is to be understood that there can be any number of VR/MR experiences and, therefore, any corresponding number of metadata files.) The application software 170 can then send the appropriate metadata file to the controller 120 associated with the controller ID obtained from the storage device 102. In the example of FIG. 11, the application software 170 sends Metadata file 2 to the controller 120 (e.g., over the wireless communication network 150). In addition, as described further below, the application software 170 can send a delay value to the controller 120 associated with the controller ID to instruct the controller 120 to wait until a specified time to begin coordinating special effects so that they are in synchronism with the portion of the VR/MR experience presented via the headset 105.

An advantage of the example approach illustrated in FIG. 11 is that the VR/MR experience and/or special effects can be updated in a simple manner by downloading one or more new metadata files to the headset 105 (or mobile device 160). Such updating can be accomplished using conventional techniques (e.g., over-the-air (OTA) updates).

It is to be understood that, as an alternative to the application software 170 identifying and sending the appropriate metadata file to the selected controller 120, the controller 120 can have its own local copies of the metadata files. In such embodiments, the application software 170 can send only the experience ID to the controller 120, and the controller 120 can identify the correct metadata file among its local files. In such embodiments, the local copies of the metadata files at the controller 120 can be updated whenever the files accessed by the application software 170 are updated. The application software 170 can coordinate updating the local files of the controller 120, e.g., using the wireless communication network 150. An advantage of this approach is that at the time the VR/MR experience is to be launched (e.g., when a user is waiting), the application software 170 sends less information to the controller 120 (simply the experience ID), thereby reducing the likelihood of errors during transmission over the wireless communication network 150 and potentially allowing the user's experience to begin more quickly.

Figure 12:
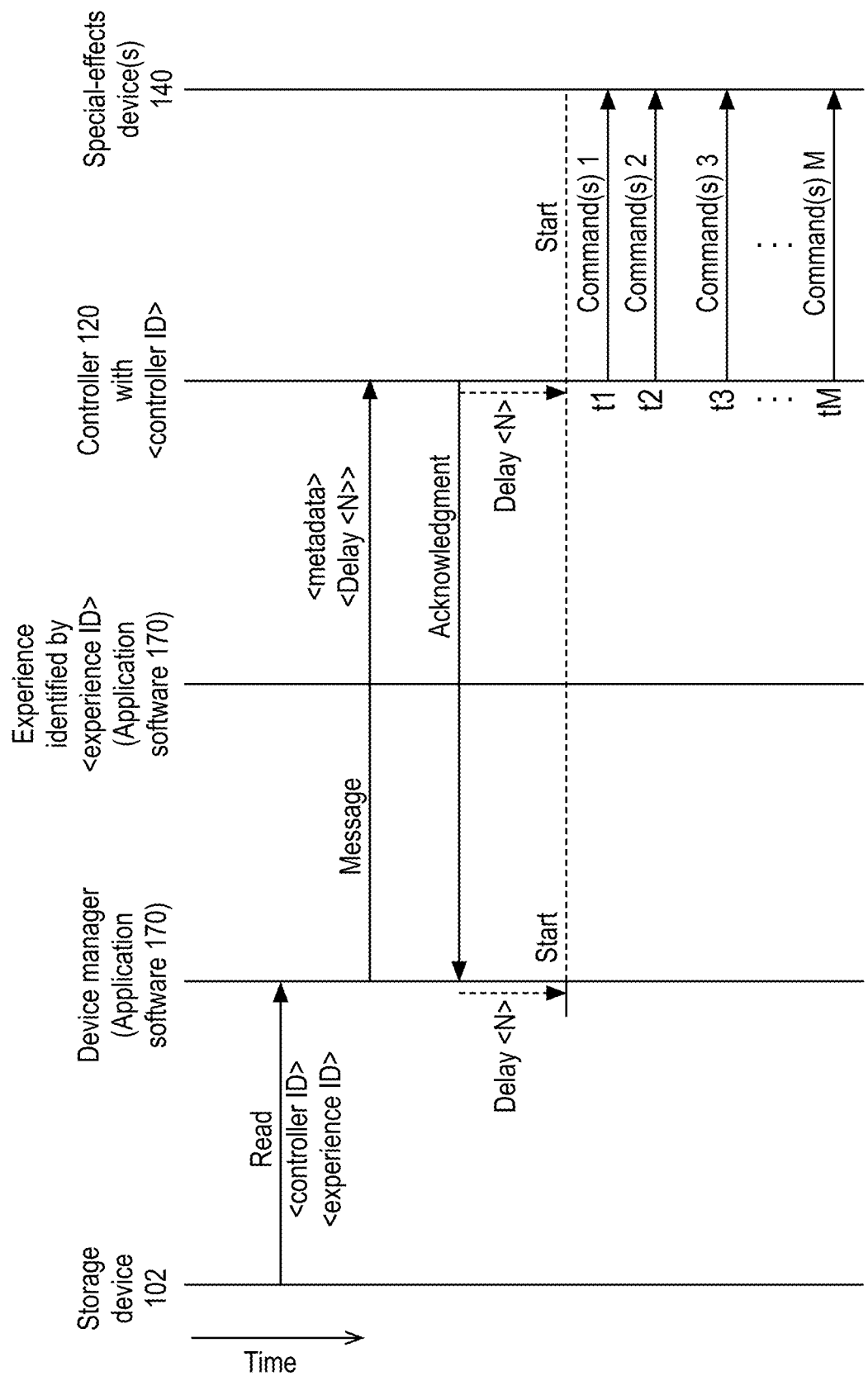
FIG. 12 illustrates an example of the timing of communications between the storage device, the application software, the controller, and the at least one special-effects device to successfully launch a VR/MR experience in accordance with some embodiments.

FIG. 12 illustrates an example of the timing of communications between the storage device 102, the application software 170, the controller 120, and the at least one special-effects device 140 to successfully launch a VR/MR experience in accordance with some embodiments. The sequence begins with the controller ID and experience ID being read from the storage device 102 by the application software 170 of the headset 105 (which, as previously explained, may be running on a mobile device 160). As explained above, in some embodiments, the application software 170 identifies an appropriate metadata file based on the experience ID and sends an addressed message (e.g., identifying the intended recipient controller 120) to the controller 120 corresponding to the controller ID. In the example of FIG. 12, the application software 170 creates and sends an addressed message to the controller 120 corresponding to the controller ID (e.g., over the wireless communication network 150). In some embodiments, the message includes the metadata file corresponding to the selected VR/MR experience and a delay ("Delay <N>"), which informs the controller 120 when the headset 105 will start the presentation of its portion of the selected VR/MR experience. Delaying when the presentation of the VR/MR experience will begin can give the user time to prepare for the VR/MR experience (e.g., to enter a pool or tank). The controller 120 reads the message and sends the application software 170 an acknowledgment. After the specified delay has elapsed, the application software 170 begins presentation of the portion of the VR/MR experience presented through the headset 105, and the controller 120 simultaneously begins its portion of the VR/MR experience. As described above, the controller 120 sends commands/instructions to the at least one special-effects device 140 at various times in coordination with the portion of the VR/MR experience being presented through the headset 105. In the example of FIG. 12, the controller 120 sends a first set of one or more commands ("Command(s) 1") at a time t1, a second set of one or more commands ("Command(s) 2") at a time t2, a third set of one or more commands ("Command(s) 3") at a time t3, etc.

It is to be understood that although FIG. 12 presents an example in which the application software 170 specifies a delay to the controller 120 in the message that provides the metadata file, the delay may be prearranged. For example, the application software 170 and controller 120 can both always delay the execution of their portions of the VR/MR experience for a fixed amount of time (e.g., 10 seconds) after the controller 120 sends the acknowledgment. Alternatively, the controller 120 can specify the delay in the acknowledgment message. The value of the delay can be derived empirically or deterministically, depending on the latencies of the components (e.g., the special-effects device(s) 140, the processor 130A, the controller 120, etc.) of the system 100 and/or the amount of time a user is expected to need to prepare for the VR/MR experience (e.g., to put on the headset 105, enter a pool or tank, etc.).

Moreover, and as explained above, the message from the application software 170 to the controller 120 may provide information that allows the controller 120 to obtain the information it needs to coordinate special effects for the VR/MR experience (e.g., the application software 170 may provide an experience ID rather than a metadata file, and the controller 120 may obtain whatever information it needs from local storage or from another source (e.g., a server)).

Figure 13:
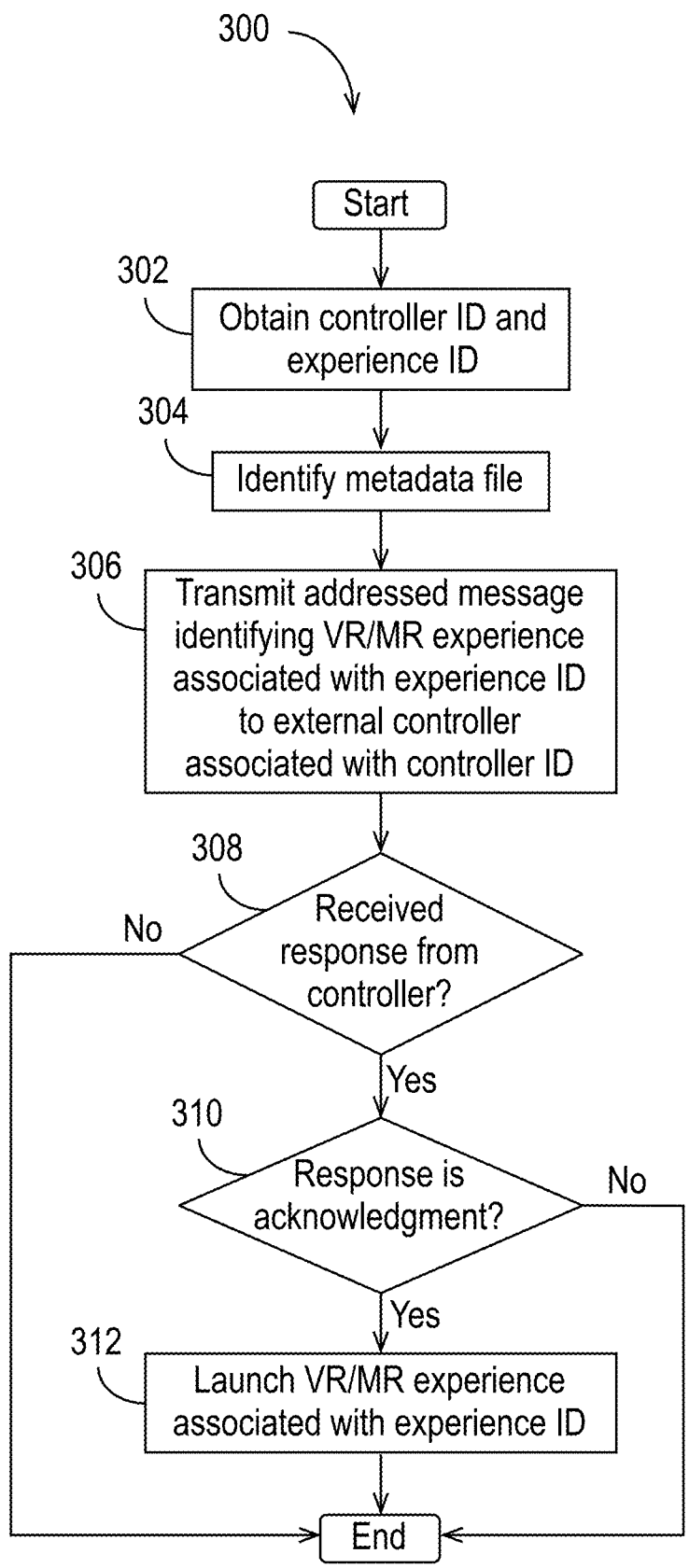
FIG. 13 is an example process performed by a headset to launch a VR/MR experience that includes special effects, in accordance with some embodiments.
Figure 14:
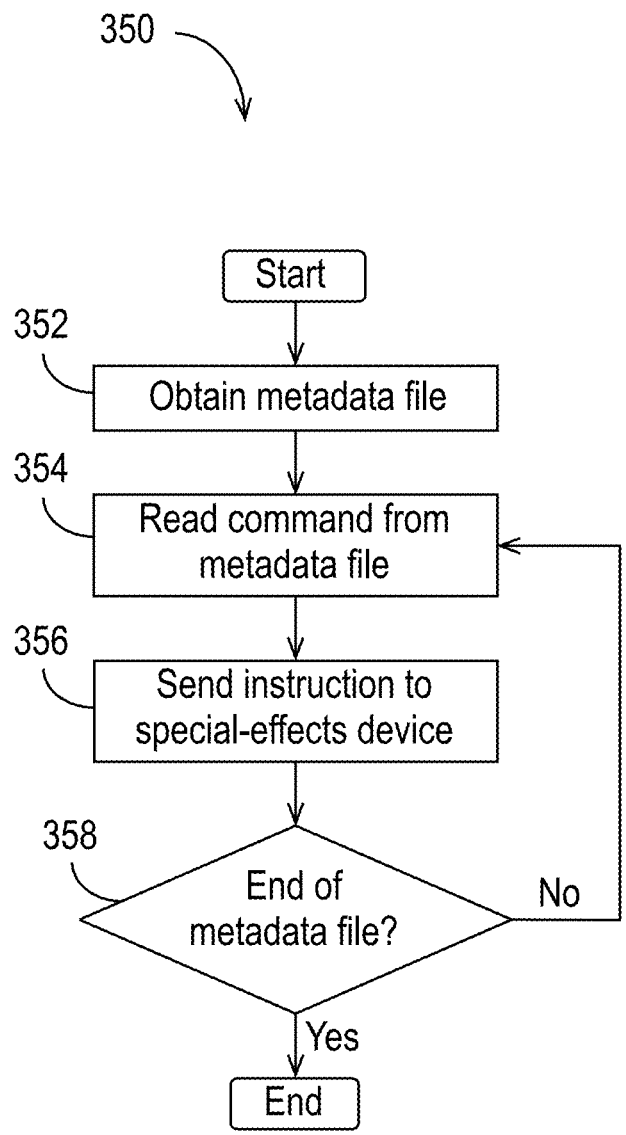
FIG. 14 is an example process performed by a controller to launch a VR/MR experience that includes special effects, in accordance with some embodiments.

FIG. 13 and FIG. 14 further illustrate the procedures and communications of the headset 105 (e.g., application software 170) and controller 120 in accordance with some embodiments. FIG. 13 is an example process 300 performed by a headset 105 (e.g., application software 170) to launch a VR/MR experience that includes special effects, in accordance with some embodiments. At block 302, the headset 105 obtains the controller ID and experience ID (e.g., by reading a storage device 102). At block 304, the headset 105 identifies the appropriate metadata file corresponding to the VR/MR experience having the experience ID. At block 306, the headset 105 transmits an addressed message identifying the VR/MR experience to the controller 120 corresponding to the controller ID obtained from the storage device 102. At decision point 308, the headset 105 determines whether it has received a response from the controller 120. The expected response is an acknowledgment, but the controller 120 may also send a message indicating that there has been an error. Similarly, although not shown in FIG. 13, the controller 120 could fail to respond, in which case the process 300 may time out. If, at decision point 308, the headset 105 determines that it has received a response from the controller 120, the process 300 moves to decision point 310, at which the headset 105 determines whether the response from the controller 120 is an acknowledgment. If so, then at block 312 the headset 105 launches the VR/MR experience associated with the experience ID, potentially after a delay as described above.

FIG. 14 is an example process 350 performed by a controller 120 to launch a VR/MR experience that includes special effects, in accordance with some embodiments. At block 352, the controller 120 obtains a metadata file. As explained above, the controller 120 can receive the metadata file from the headset 105, or it can retrieve it from another source (e.g., local storage, a server, etc.). At block 354, the controller 120 reads a command from the metadata file. The first read can be completed before the VR/MR experience begins, during the delay described above. At block 356, the controller 120 sends one or more commands/instructions to at least one special-effects device 140 in accordance with the information in the metadata file (e.g., to create the desired special effect at the desired time, in coordination with the portion of the VR/MR experience being presented via the headset 105). At decision point 358, the controller 120 determines whether there are additional special effects to be created, or if the end of the metadata file has been reached. If there are additional special effects to be created, the process 350 returns to block 354, and the next command from the metadata file is read. If the end of the metadata file has been reached, the process 350 ends.

Although FIG. 14 refers to the use of a metadata file, it is to be appreciated that the information describing special effects can be determined and/or stored in other ways. For example, some special effects may be created based on a communication from the headset 105 (e.g., the application software 170) during the VR/MR experience regarding the position and/or orientation of the headset 105. Similarly, the information regarding pre-arranged special effects can be stored in other ways (e.g., not simply in a metadata file). The examples presented herein are intended to be illustrative and not limiting.

In some embodiments, a system 100 includes multiple controllers 120 and multiple headsets 105, where any of the multiple headsets 105 can be used with any of the multiple controllers 120, and VR/MR experiences can be provided asynchronously to users. In other words, in some embodiments, a first user can experience a first VR/MR experience with assistance from a first headset 105 and a first controller 120 starting at a first time, and a second user can experience a second VR/MR experience with assistance from a second headset 105 and a second controller 120 starting at a second time that is different from and unrelated to the first time. To communicatively couple particular headsets 105 to particular controllers 120 in this situation, some embodiments provide one or more launchers to set the VR/MR experience for each headset 105 and/or controller 120. The one or more launchers may be, for example, one or more storage devices 102. In some such embodiments, the one or more launchers are not only encoded with the information about which VR/MR experience to launch and a forward direction, but also information identifying a specific controller 120. For example, the wireless communication network 150 may be a Bluetooth network, and there may be launchers (e.g., one or more storage devices 102) assigned to (or associated with) each controller 120. Each VR/MR experience and controller 120 combination may be captured on a respective launcher. The controller ID of the controller 120 may be encoded with, for example, the Bluetooth MAC IDs of the controller 120.

As an example, if N VR/MR experiences are available, each may be identified by data stored on a respective one of N storage devices 102, each of which may comprise, for example, a NFC card or an RFID tag. Continuing the example, if there are M controllers 120, there may be a total of M×N NFC cards or RFID tags, each storing a unique combination of VR/MR experience and controller ID.

Figure 15:
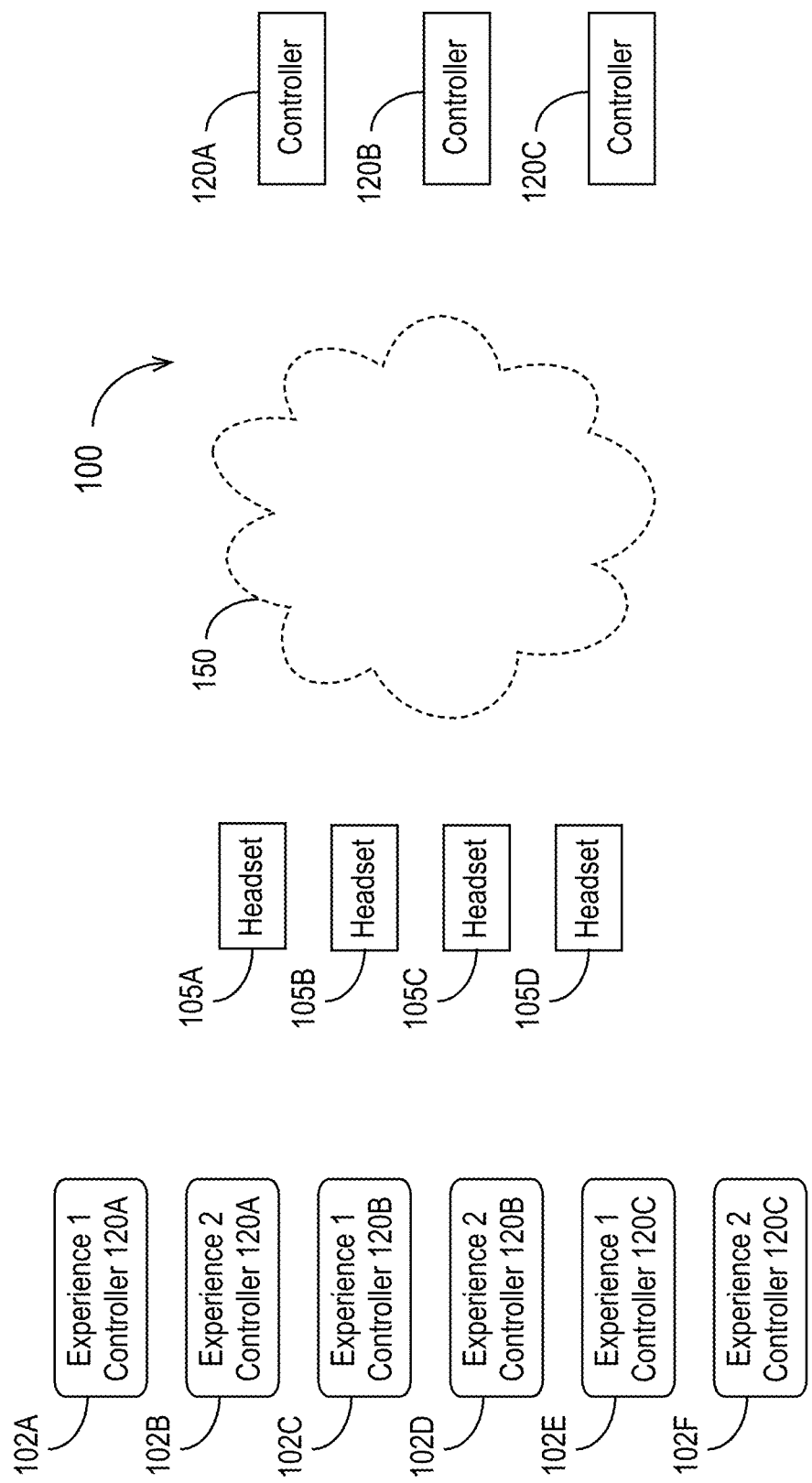
FIG. 15 illustrates an example system that includes multiple controllers and multiple headsets in accordance with some embodiments.

FIG. 15 illustrates an example system 100 that includes multiple controllers 120 and multiple headsets 105. FIG. 15 shows four headsets 105, namely headset 105A, headset 105B, headset 105C, and headset 105D, and three controllers 120, namely controller 120A, controller 120B, and controller 120C. Also shown are several storage devices 102, namely storage device 102A, storage device 102B, storage device 102C, storage device 102D, storage device 102E, and storage device 102F. The storage devices 102 comprise hardware and/or software to facilitate near-field communication. For example, the storage devices 102 may comprise NFC tags or cards, or RFID tags or cards.

In the example of FIG. 15, the system 100 is assumed to be configured to provide two VR/MR experiences, namely, Experience 1 and Experience 2, and each of the storage devices 102 stores a different combination of an experience ID and a controller ID. Specifically, storage device 102A stores an experience ID that identifies Experience 1 and a controller ID that identifies controller 120A; storage device 102B stores an experience ID that identifies Experience 2 and a controller ID that identifies namely controller 120A; storage device 102C stores an experience ID that identifies Experience 1 and a controller ID that identifies controller 120B; storage device 102D stores an experience ID that identifies Experience 2 and a controller ID that identifies controller 120B; storage device 102E stores an experience ID that identifies Experience 1 and a controller ID that identifies controller 120C; and storage device 102F stores an experience ID that identifies Experience 2 and a controller ID that identifies controller 120C. Thus, the collection of storage devices 102 represents each unique combination of two VR/MR experiences (Experience 1 and Experience 2) and each available controller 120 (namely controller 120A, identifies controller 120B, and identifies controller 120C). It is to be appreciated that the system 100 can support fewer or more VR/MR experiences and fewer or more controllers 120. Similarly, there can be more or fewer storage devices 102 (e.g., there can be duplicates of individual storage devices 102, or a single storage device may store more than one experience ID and/or more than one controller ID, where the desired one(s) can be selected, e.g., by a user).

In the example illustrated in FIG. 15, it is assumed that any of the multiple headsets 105 can be used with any of the multiple controllers 120. Assuming that the experience ID and controller ID are conveyed from the storage device 102 to the headset 105 via NFC, a particular headset 105/controller 120 combination can be configured to present a particular VR/MR experience by bringing an appropriate storage device 102 within the communication range of the selected headset 105. For example, to present Experience 2 to a user via headset 105C in coordination with controller 120B, the storage device 102D (e.g., NFC or RFID card or tag) can be brought within the NFC detection range of the headset 105C. The headset 105C can then read the experience ID (Experience 2) and controller ID (controller 120B) and proceed as described above in the discussion of FIG. 11.

FIG. 16 illustrates the use of several special-effects devices 140 to provide VR/MR experiences that take place partially or fully underwater in accordance with some embodiments. FIG. 16 shows three special-effects devices 140, namely special-effects device 140A, special-effects device 140B, and special-effects device 140C. Each of the special-effects devices 140 has a respective above-water portion 242 (namely above-water portion 242A, above-water portion 242B, and above-water portion 242C) and a respective below-water portion 244 (namely below-water portion 244A, below-water portion 244B, and below-water portion 244C) connected by a respective connector portion 246 (namely connector portion 246A, connector portion 246B, and connector portion 246C). The special-effects device 140A, special-effects device 140B, and special-effects device 140C may be capable of providing the same special effects, or they may be capable of providing different special effects. Furthermore, they may be controlled by respective controllers 120, or two or more of the special-effects devices 140 can be controlled by the same controller 120.

In some embodiments for providing underwater VR/MR experiences, it is desirable for the user to stay in a substantially stationary position or within a certain area or volume of water, to prevent collisions with the water container (e.g., pool, tank, etc.) or other users experiencing their own VR/MR experiences. A tether system, which may include a flotation device 260 (e.g., as illustrated in FIG. 8) to provide buoyancy, can be used for this purpose. For example, the user can wear a belt or harness that gives him/her buoyancy in water and restricts his/her physical movement to a small radius based on the length of the tether cord. Modifications to this tether can be made, such as pressure or stress/tension other types of data measurement devices, to help inform the computational units that relay position and velocity to the controller 120 and/or mobile device 160 and/or headset 105. The tether can be held in place via fixed hardware connected to the boundaries of the container or via a significantly weighted unit that has the option to be moved or removed.

It is to be appreciated that the user may be provided with a flotation device 260 without an accompanying tether merely to assist the user to float or remain in a desired position during the VR/MR experience.

In some embodiments, one or more user biometrics are collected by the system 100 to determine whether a VR/MR experience should be modified or terminated. For example, the user's heart rate, breathing rate, and/or the phase and/or timing of the user's respiration can be detected and used to change or determine some aspect of the VR/MR experience. For example, the at least one handle 245 of a special-effects device 140 may include sensors to detect the user's pulse/heart rate. As another example, an onboard sensor of the headset 105, such as a microphone, or a pressure sensor mounted on a flotation device 260 coupled to the user can detect characteristics of the user's breathing (e.g., rate, phase, timing, deviations from a baseline, etc.) and relay that information to the headset 105 and/or mobile device 160. The headset 105 and/or mobile device 160 and/or controller 120 can take into account the detected user biometrics in real-time to modify the VR/MR experience (e.g., by changing the speed/cadence of the VR/MR experience, adding or removing sequences from the presented VR/MR experience, changing the duration of the VR/MR experience, adding or removing content from the VR/MR experience, etc.). For example, in a meditation or relaxation-based VR/MR experience, the user could be encouraged to slow their breathing or match a particular breathing pattern, and their own breathing could change the way the world "breathes with them." As another example, if the headset 105 and/or mobile device 160 determines that the user's heart rate or breathing suggests that the user is frightened or under stress, the headset 105 and/or mobile device 160 and/or controller 120 can alter the VR/MR experience with the goal of reducing the user's level of fright or stress (e.g., if the user is young or known to have a health condition or has expressed a preference for a more easygoing VR/MR experience).

Although some of the explanations herein assume that a controller 120 provides only one VR/MR experiences at a time, it is envisioned that a single controller 120 could provide more than one VR/MR experience simultaneously. For example, a controller 120 can be communicatively coupled to multiple sets of one or more special-effects device 140, where each of the multiple sets of one or more special-effects device 140 provides a separate VR/MR experience. In light of the disclosures herein, those having ordinary skill in the art will be able to make and use systems in which a single controller 120 provides multiple VR/MR experiences at the same time.

Various of the systems and methods disclosed herein may be implemented, at least in part, by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the various system components, devices and appliances described above (e.g., programmed processor(s) as shown in FIGS. 3 and 5, mobile device 160, etc.). Computer-readable media in which such instructions and data may be embodied include, but are not limited to, non-volatile storage media in various non-transitory forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Headings are used in this document for convenience. The headings are not intended to limit the disclosures in any way. For example, although the portion of the document with the heading "Headset" is primarily focused on disclosures related to the headset 105, other portions of the document also disclose aspects of the headset 105. Likewise, the section with the heading "Headset" may include disclosures of or relevant to other aspects of the systems and/or methods disclosed herein.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales (e.g., if the units of a measurement are meters, two features having lengths of 1.000 m and 1.001 m would have substantially equal lengths). As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A system for providing a selected virtual-reality (VR) or mixed-reality (MR) experience to a user in water, the selected VR or MR experience being one of a plurality of available VR or MR experiences, the system comprising:
   a first headset; and
   a first controller comprising:
      a first wireless communication module for communicating with the first headset over a wireless network,
      a first network interface for communicating with a first special-effects device, the first special-effects device for creating an effect during the selected VR or MR experience, and
      a first at least one processor coupled to the first wireless communication module and to the first network interface, wherein the first at least one processor is configured to execute a first set of one or more machine-executable instructions that, when executed, cause the first at least one processor to:
         in cooperation with the first wireless communication module, receive an addressed message from the first headset over the wireless network, the addressed message identifying the first controller and the selected VR or MR experience,
         identify a first command for the first special-effects device, and
         in cooperation with the first network interface, send a first instruction to the first special-effects device, wherein the first instruction is configured to cause the first special-effects device to create the effect at a first predetermined time during the selected VR or MR experience.

2. The system recited in claim 1, further comprising:
   the first special-effects device, wherein the first special-effects device is coupled to or configured to be coupled to the first controller through the first network interface and to create the effect at the first predetermined time during the selected VR or MR experience.

3. The system recited in claim 2, wherein the effect comprises one or more of: a current, bubbles, heated or cooled air, heated or cooled water, a sound, or a vibration.

4. The system recited in claim 2, wherein the first special-effects device comprises one or more of: a current generator, a bubble generator, a sound generator, or a vibration generator.

5. The system recited in claim 2, wherein the first headset comprises a watertight enclosure configured to receive a mobile device and to prevent water from entering the watertight enclosure.

6. The system recited in claim 2, wherein the first headset comprises a chamber configured to allow water to enter the chamber between at least one lens of the first headset and a display screen within the first headset.

7. The system recited in claim 2, wherein when executed by the first at least one processor, the first set of one or more machine-executable instructions further cause the first at least one processor to:
   identify a second command for the first special-effects device; and
   in cooperation with the first network interface, send a second instruction to the first special-effects device, wherein the second instruction is configured to cause the first special-effects device to create the effect at a second predetermined time during the selected VR or MR experience.

8. The system recited in claim 7, wherein the effect at the first predetermined time or the effect at the second predetermined time is dependent on at least one of: a point of view of the user during the selected VR or MR experience, a position of the user relative to a real-world object during the selected VR or MR experience, a position of the user relative to another person during the selected VR or MR experience, a progress point in the selected VR or MR experience, an action taken by the user during the selected VR or MR experience, an input from the user, a button press by the user, or change in breathing rate of the user during the selected VR or MR experience.

9. The system recited in claim 7, wherein the first special-effects device comprises at least one of: a current generator, a bubble generator, a sound generator, or a vibration generator.

10. The system recited in claim 7, wherein the effect comprises one or more of: a current, bubbles, heated or cooled air, heated or cooled water, a sound, or a vibration.

11. The system recited in claim 2, wherein the effect is a first effect, and wherein, when executed by the first at least one processor, the first set of one or more machine-executable instructions further cause the first at least one processor to:
identify a second command for the first special-effects device; and
in cooperation with the first network interface, send a second instruction to the first special-effects device, wherein the second instruction is configured to cause the first special-effects device to create a second effect at a second predetermined time during the selected VR or MR experience.

12. The system recited in claim 11, wherein at least one of the first effect or the second effect is dependent on at least one of: a point of view of the user during the selected VR or MR experience, a position of the user relative to a real-world object during the selected VR or MR experience, a position of the user relative to another person during the selected VR or MR experience, a progress point in the selected VR or MR experience, an action taken by the user during the selected VR or MR experience, an input from the user, a button press by the user, or change in breathing rate of the user during the selected VR or MR experience.

13. The system recited in claim 11, wherein the first special-effects device comprises a current generator, a bubble generator, a sound generator, or a vibration generator.

14. The system recited in claim 11, wherein the first effect or the second effect comprises one or more of: a current, bubbles, heated or cooled air, heated or cooled water, a sound, or a vibration.

15. The system recited in claim 1, wherein the effect is a first effect, the selected VR or MR experience is a first selected VR or MR experience, and the addressed message is a first addressed message, and further comprising:
a second headset; and
a second controller comprising:
a second wireless communication module for communicating with the second headset over the wireless network,
a second network interface for communicating with a second special-effects device, the second special-effects device for creating a second effect during a second selected VR or MR experience, and
a second at least one processor coupled to the second wireless communication module and to the second network interface, wherein the second at least one processor is configured to execute a second set of one or more machine-executable instructions that, when executed, cause the second at least one processor to:
in cooperation with the second wireless communication module, receive a second addressed message from the second headset over the wireless network, the second addressed message identifying the second controller and the second selected VR or MR experience,
identify a second command for the second special-effects device; and
in cooperation with the second network interface, send a second instruction to the second special-effects device, wherein the second instruction is configured to cause the second special-effects device to cause a second effect at a second predetermined time during the second selected VR or MR experience, the second predetermined time being identical to or different from the first predetermined time.

16. The system recited in claim 15, wherein the first selected VR or MR experience and the second selected VR or MR experience are different ones of the plurality of available VR or MR experiences.

17. The system recited in claim 15, wherein the first selected VR or MR experience and the second selected VR or MR experience are asynchronous.

18. The system recited in claim 1, wherein the effect is a first effect, the selected VR or MR experience is a first selected VR or MR experience of the plurality of available VR or MR experiences, and the addressed message is a first addressed message, and wherein the first controller further comprises:
a second network interface for communicating with a second special-effects device, the second special-effects device for creating a second effect during a second selected VR or MR experience of the plurality of available VR or MR experiences,
and wherein, when executed by the first at least one processor, the first set of one or more machine-executable instructions further causes the first at least one processor to:
in cooperation with the first wireless communication module, receive a second addressed message from a second headset over the wireless network, the second addressed message identifying the second selected VR or MR experience,
identify a second command for the second special-effects device; and
in cooperation with the second network interface, send a second instruction to the second special-effects device, wherein the second instruction is configured to cause the second special-effects device to create a second effect at a second predetermined time during the second selected VR or MR experience, the second predetermined time being identical to or different from the first predetermined time.

19. The system recited in claim 1, wherein the first headset is configured to obtain information identifying the selected VR or MR experience from an external storage device via near-field communication.

* * * * *